(12) United States Patent
Kobashi et al.

(10) Patent No.: US 12,194,991 B2
(45) Date of Patent: Jan. 14, 2025

(54) 3D OCCLUSION REASONING FOR ACCIDENT AVOIDANCE

(71) Applicants: Nissan North America, Inc., Franklin, TN (US); Renault S.A.S., Boulogne-Billancourt (FR)

(72) Inventors: Atsuhide Kobashi, Sunnyvale, CA (US); Stefan Witwicki, San Carlos, CA (US); Christopher Ostafew, Mountain View, CA (US); Kyle Hollins Wray, Fremont, CA (US); Kuniaki Noda, Kanagawa (JP)

(73) Assignees: Nissan North America, Inc., Franklin, TN (US); Renault S.A.S., Boulogne-Billancourt (FR)

( * ) Notice: Subject to any disclaimer, the term of this patent is extended or adjusted under 35 U.S.C. 154(b) by 121 days.

(21) Appl. No.: 18/186,315

(22) Filed: Mar. 20, 2023

(65) Prior Publication Data
US 2023/0227031 A1 Jul. 20, 2023

Related U.S. Application Data

(63) Continuation of application No. 16/804,554, filed on Feb. 28, 2020, now Pat. No. 11,635,763.

(51) Int. Cl.
| | |
|---|---|
| *B60W 30/09* | (2012.01) |
| *B60W 30/18* | (2012.01) |
| *B60W 60/00* | (2020.01) |
| *G05D 1/00* | (2024.01) |
| *G06V 10/26* | (2022.01) |
| *G06V 20/58* | (2022.01) |
| *G08G 1/16* | (2006.01) |

(52) U.S. Cl.
CPC ...... *B60W 30/09* (2013.01); *B60W 30/18163* (2013.01); *B60W 60/001* (2020.02); *G05D 1/0088* (2013.01); *G05D 1/0214* (2013.01); *G06V 10/26* (2022.01); *G06V 20/58* (2022.01); *G08G 1/166* (2013.01); *B60W 2554/4041* (2020.02); *B60W 2720/106* (2013.01)

(58) Field of Classification Search
CPC ............... B60W 30/09; B60W 60/001; B60W 30/18163; B60W 2554/4041; B60W 2720/106; G06V 20/58; G06V 10/26; G05D 1/0088; G05D 1/0214; G08G 1/166

See application file for complete search history.

(56) References Cited

U.S. PATENT DOCUMENTS

2021/0061269 A1  3/2021  Petroff et al.

*Primary Examiner* — Michael D Lang
(74) *Attorney, Agent, or Firm* — Young Basile Hanlon & MacFarlane, P.C.

(57) ABSTRACT

An occlusion is identified in a vehicle transportation network. A visibility grid is identified on a second side of the occlusion for a vehicle that is on a first side of the occlusion. The visibility grid is identified with respect to a region of interest that is at least a predefined distance above ground. The visibility grid is used to identify first portions of roads sensed by a sensor positioned on the vehicle and second portions of the roads that are not sensed by the sensor. A driving behavior of the vehicle is altered based on the visibility grid.

20 Claims, 11 Drawing Sheets

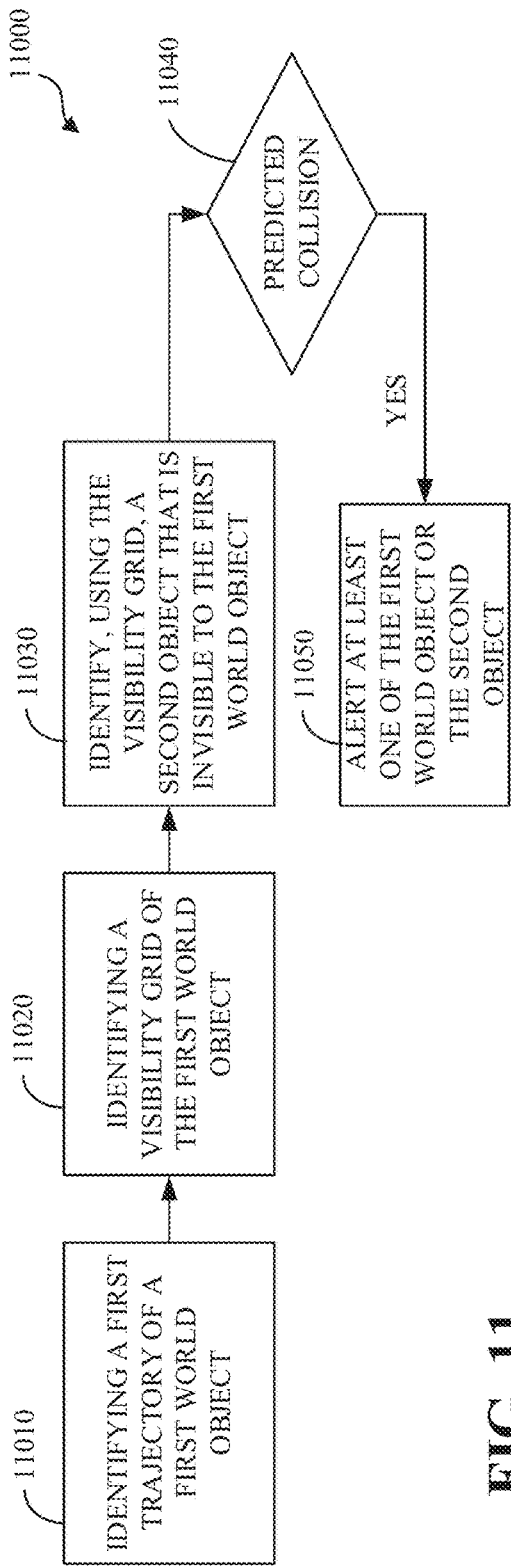

3D OCCLUSION REASONING FOR ACCIDENT AVOIDANCE

CROSS REFERENCE TO RELATED APPLICATIONS

This application is a continuation of U.S. patent application Ser. No. 16/804,554, filed on Feb. 28, 2020, the entire disclosure of which is incorporated herein by reference.

TECHNICAL FIELD

This disclosure relates generally to autonomous vehicle operational management and autonomous driving, and more particularly to autonomous vehicle operation that uses 3-dimensional reasoning regarding occlusions for accident avoidance.

BACKGROUND

A vehicle, such as an autonomous vehicle, may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. On occasion, an occlusion makes some data unavailable.

SUMMARY

Disclosed herein are aspects, features, elements, implementations, and embodiments of autonomous vehicle operation with 3-dimensional (3D) occlusion reasoning for accident avoidance.

A first aspect is a method for use in traversing a vehicle transportation network by a first vehicle. The method includes identifying an occlusion in the vehicle transportation network; identifying, for the first vehicle that is on a first side of the occlusion, a visibility grid on a second side of the occlusion that is different from the first side, the visibility grid is identified with respect to a region of interest that is at least a predefined distance above ground; and altering a driving behavior of the first vehicle based on the visibility grid. The visibility grid is used to identify first portions of roads sensed by a sensor positioned on the first vehicle and second portions of the roads that are not sensed by the sensor.

A second aspect is a method for use in traversing a vehicle transportation network by a first vehicle. The method includes identifying an occlusion in the vehicle transportation network; identifying, for the first vehicle that is on a first side of the occlusion, a visibility grid on a second side of the occlusion that is different from the first side; computing a probability of a presence of a world object within an unobserved region of the visibility grid; and altering a driving behavior of the first vehicle based on the probability. A height of the occlusion is such that at least some world objects in the visibility grid are undetectable by a sensor of the first vehicle.

A third aspect is an apparatus for use in traversing a vehicle transportation network by a vehicle. The apparatus includes a non-transitory computer readable medium and a processor. The processor is configured to execute instructions stored on the non-transitory computer readable medium to identify an occlusion in the vehicle transportation network, where the vehicle is on a first side of the occlusion; determine a visibility grid that is a predefined distance above ground on a second side of the occlusion based on a height of external objects of interest that are likely to be on the second side of the occlusion that is different from the first side; and in response to determining, based on the visibility grid, that the external object exists within the second side, alter a driving behavior of the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

FIG. 11 is a flow chart diagram of another technique for traversing a vehicle transportation network using 3D occlusions reasoning for accident avoidance in accordance with embodiments of this disclosure.

FIG. 12 is an example of a scenario for alerting external objects based on a visibility grid of at least one of the external objects.

DETAILED DESCRIPTION

Figure 1:
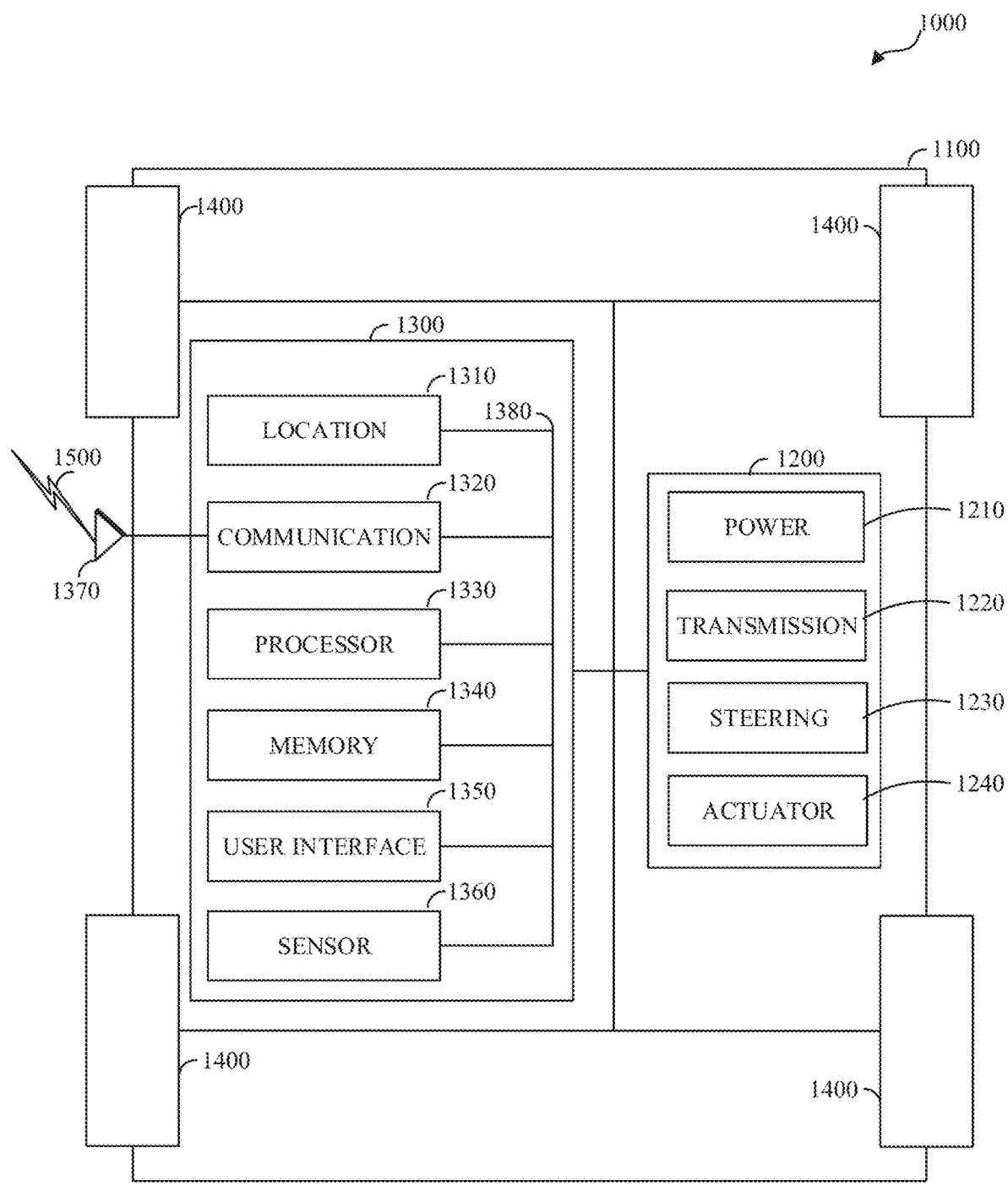
FIG. 1 is a diagram of an example of a vehicle in which the aspects, features, and elements disclosed herein may be implemented.

A vehicle, such as an autonomous vehicle (AV), a semi-autonomous vehicle, and/or an advanced driver assistance (ADAS) vehicle (collectively referred to herein as an AV) may traverse a portion of a vehicle transportation network. The vehicle may include one or more sensors and traversing the vehicle transportation network may include the sensors generating or capturing sensor data, such as sensor data corresponding to an operational environment of the vehicle, or a portion thereof. For example, the sensor data may include information corresponding to one or more external objects, such as pedestrians, remote vehicles, other objects within the vehicle operational environment, vehicle transportation network geometry, or a combination thereof.

The autonomous vehicle may include an autonomous vehicle operational management system, which may include one or more operational environment monitors that may process operational environment information, such as the sensor data, for the autonomous vehicle. The operational environment monitors may include a blocking monitor that may determine probability of availability information for portions of the vehicle transportation network spatiotemporally proximate to the autonomous vehicle.

The autonomous vehicle operational management system may include an autonomous vehicle operational management controller, which may detect one or more operational scenarios, such as pedestrian scenarios, intersection scenarios, lane change scenarios, any other vehicle operational scenario, or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. That is, each model is configured to handle a specific scenario. The autonomous vehicle operational management controller may instantiate respective instances of the scenario-specific operational control evaluation modules in response to detecting the corresponding operational scenarios.

The autonomous vehicle operational management controller may receive one or more candidate vehicle control actions from respective instantiated scenario-specific operational control evaluation module (SSOCEM) instances, may identify a vehicle control action from the one or more candidate vehicle control actions, and may control the autonomous vehicle to traverse a portion of the vehicle transportation network according to the identified vehicle control action.

AVs are intended to reduce accidents on the road. While an AV may have 360-degree sensor coverage to always be aware of its entire surroundings, its visibility can still be limited by objects that obstruct the views of the sensors. Additionally, for the foreseeable future, AVs are expected to continue to share the road with other humans (e.g., human drivers, pedestrians, etc.) who are naturally limited to a narrower field of view based on the direction of their gaze. The narrower field of view can cause blind spots and areas on the road to which a human (e.g., a human driver) may not pay attention. These two limitations (e.g., the occluded areas for the AV sensors, and the blind spots for other road users) can be the cause of many accidents.

Techniques described herein can prevent accidents from occurring between an AV and other road users and/or between two or more other road users. By reasoning about which areas of the road are occluded for the AV and these other road users, the techniques describes herein determine visibility grids by looking beyond an obstruction.

The visibility grid can used by a decision-making and trajectory-planning components of an autonomous vehicle to potentially alter its driving actions to more safely account for potential obstacles and hazards in the non-visible/occluded areas of the visibility grid. To illustrate, the AV may adjust its own speed plan to slow down for potential children playing in an occluded area behind a bus, or for switching lanes on a highway to get out of another driver's estimated non-visible space (e.g., a blindspot). In another example, the visibility grid for two or more road users can be used by the AV or some infrastructure agent to recognize when each of the road users is in the occluded space of the other and present a warning.

In an example, the driving behavior of an AV can be altered (e.g., slowed down, stopped, accelerated, etc.) to avoid near-misses or accidents based on determining a visibility grid of where sensors of the AV can and cannot see.

In another example, the driving behavior of the AV can be altered to avoid near-misses or accidents based on determining respective visibility grids for other road users (i.e., external objects), such as where a driver of another vehicle can and cannot see. For example, in response to determining that the AV is in the blind spot of another vehicle, the AV can be slowed down, sped up, moved to another lane, or some other action so that the AV is no longer in the blind spot of the other vehicle.

In yet another example, visibility grids of respective external objects can be determined and an alert (e.g., warning) can be provided to at least one of the external objects in response to determining that the at least one of the external object is likely to collide with another external object.

Some other techniques may determine visibility grids by considering, for example, visibility within a planar area that extends from the center of the AV in a direction parallel to the ground. According to such techniques, all coordinates on an opposite side of an obstruction can be considered obstructed (e.g., unobserved, unseen, etc.).

Contrastingly, the techniques described herein determine visibility grids in three dimensions (3D). The techniques described herein can account for varying heights of occluding and occluded entities, and thus have an advantage of providing an understanding and delineation of the figurative shadow cast behind objects (e.g., other vehicles, trees, or topography—such as a dip in a road). As such, some regions (e.g., a collection of coordinates) on an opposite side of an obstruction can be determined to be unobstructed (e.g., observed, seen, etc.). As such, in some situations, better and more accurate decision making can be carried out when it is known with certainty that, within an occluded area, an external object does not exist or that it does exist and/or the trajectory of the external object is known (e.g., observed, predicted, etc.).

Additionally, the techniques described herein can be considered to bestow a social intelligence on autonomous vehicles because, and as further described below, the techniques enable an AV (i.e., modules therein, such as the SSOCEM instances described below) to reason about the limited perception that other road users have of the AV and of one another. As such, collisions can be anticipated and prevented beyond simply reasoning about ego perceptual limitations (i.e., the perceptual limitations of the AV itself) alone.

FIG. 1 is a diagram of an example of a vehicle in which the aspects, features, and elements disclosed herein may be implemented. In the embodiment shown, a vehicle 1000 includes various vehicle systems. The vehicle systems include a chassis 1100, a powertrain 1200, a controller 1300, and wheels 1400. Additional or different combinations of vehicle systems may be used. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, transmits the energy to the wheels 1400 to provide a motive force. The transmission 1220 may be controlled by the controller 1300, the actuator 1240, or both. The steering unit 1230 may be controlled by the controller 1300, the actuator 1240, or both and control the wheels 1400 to steer the vehicle. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 1000.

The sensors 1360 include one or more sensors 1360 that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
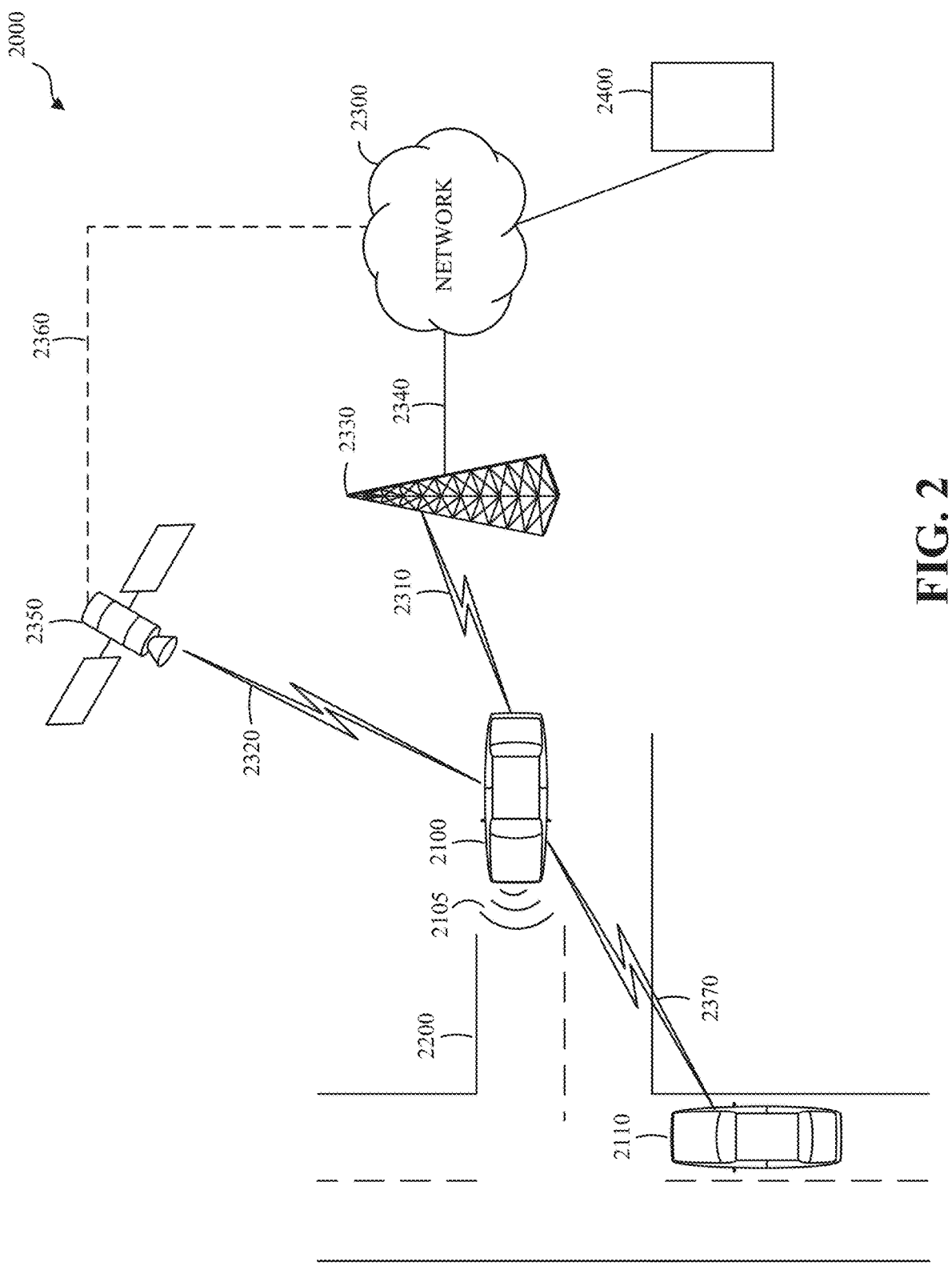
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensor 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
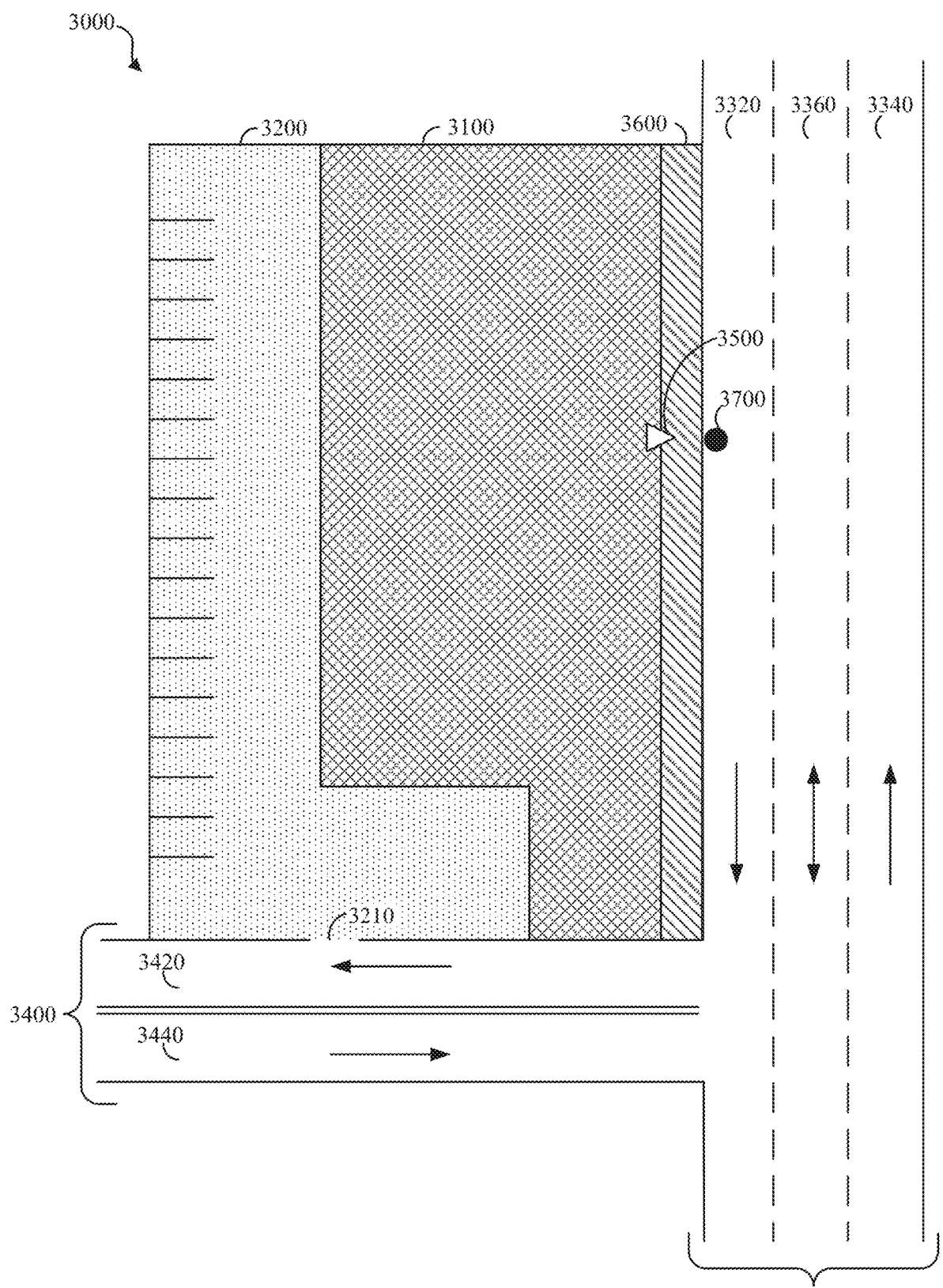
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 3000 shown in FIG. 3 includes an interchange 3210 between the parking area 3200 and road 3400.

A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, a number of lanes, known hazards, or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian walkway or crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3. A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed.

Figure 4:
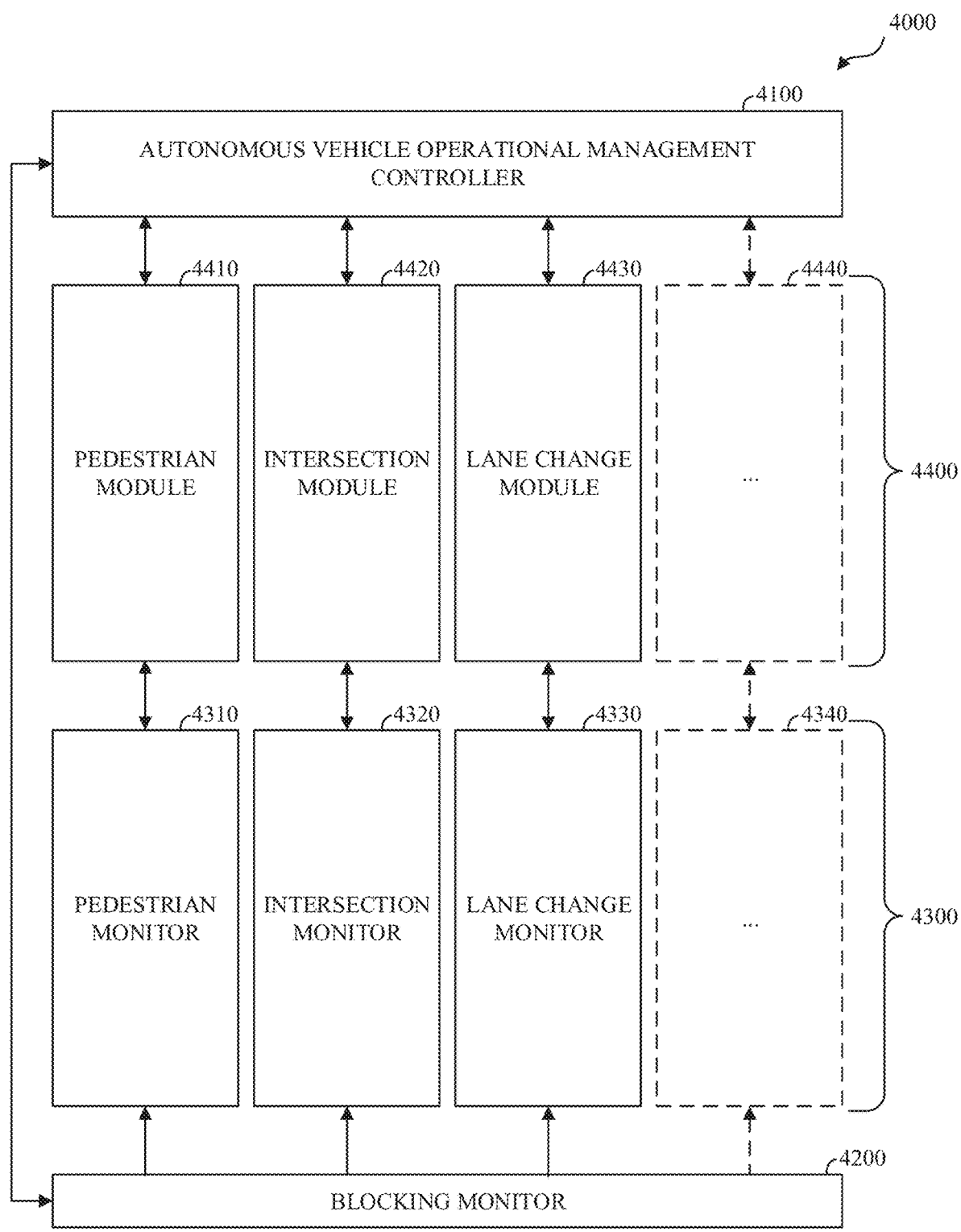
FIG. 4 is a diagram of an example of an autonomous vehicle operational management system in accordance with embodiments of this disclosure.

FIG. 4 is a diagram of an example of an autonomous vehicle operational management system 4000 in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario (also called a scenario herein) may include any distinctly identifiable set of operative conditions that may affect the operation of the autonomous vehicle within a defined spatiotemporal area, or operational environment, of the autonomous vehicle. A distinct vehicle operational scenario may be based on a number or cardinality of roads, road segments, or lanes that the autonomous vehicle may traverse within a defined spatiotemporal distance. A distinct vehicle operational scenario may be based on one or more traffic control devices that may affect the operation of the autonomous vehicle within a defined spatiotemporal area, or operational environment, of the autonomous vehicle. A distinct vehicle operational scenario may be based on one or more identifiable rules, regulations, or laws that may affect the operation of the autonomous vehicle within a defined spatiotemporal area, or operational environment, of the autonomous vehicle. A distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios including a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes. A distinct vehicle operational scenario may separately include merging lanes, or the distinct vehicle operational scenario wherein the autonomous vehicle is changing lanes may also include merging lanes.

For simplicity and clarity, similar vehicle operational scenarios may be described herein with reference to vehicle operational scenario types or classes. A type or class of a vehicle operational scenario may refer to a particular pattern or set of patters on the scenario. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action. Examples of vehicle control actions include a 'stop' vehicle control action that stops or otherwise controls the autonomous vehicle to become or remain stationary, an 'advance' vehicle control action that moves the autonomous vehicle forward slowly for a short distance, such as a few inches or a foot, an 'accelerate' vehicle control action that accelerates the autonomous vehicle (e.g., at a defined acceleration rate or within a defined range), a 'decelerate' vehicle control action that decelerates the autonomous vehicle (e.g., at a defined deceleration rate or within a defined range), a 'maintain' vehicle control action that maintains the current operational parameters (e.g., a current velocity, a current path or route, a current lane orientation, etc.), a 'turn' vehicle control action (which may include an angle of a turn), a 'proceed' vehicle control action that begins or resumes a previously identified set of operational parameters, or any other standard vehicle operation.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include an autonomous vehicle operational management controller 4100, a blocking monitor 4200, operational environment monitors 4300, SSOCEMs 4400, or a combination thereof. Although described separately, the blocking monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the vehicle within a defined spatiotemporal area of the vehicle.

The operational environment information may include vehicle information for the autonomous vehicle, such as information indicating a geospatial location of the vehicle, information correlating the geospatial location to information representing the vehicle transportation network, a route of the vehicle, a speed of the vehicle, an acceleration state of the vehicle, passenger information of the vehicle, or any other information about the vehicle or the operation of the vehicle.

The operational environment information may include information representing the vehicle transportation network proximate to the autonomous vehicle, such as within a defined spatial distance (e.g., 300 meters) of the vehicle, information indicating the geometry of one or more aspects of the vehicle transportation network, information indicating a condition, such as a surface condition, of the vehicle transportation network, or any combination thereof.

The operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the vehicle.

The autonomous vehicle operational management controller 4100 may monitor the operational environment of the autonomous vehicle, or defined aspects thereof. Monitoring the operational environment may include identifying and tracking external objects, identifying distinct vehicle operational scenarios, or a combination thereof.

For example, the autonomous vehicle operational management controller 4100 may identify and track external objects with the operational environment of the autonomous vehicle. Identifying and tracking the external objects may include identifying spatiotemporal locations of respective external objects, which may be relative to the vehicle, identifying one or more expected paths for respective external objects, which may include identifying a speed, a trajectory, or both, for an external object. Descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include a pedestrian operational environment monitor 4310, an intersection operational environment monitor 4320, a lane change operational environment monitor 4330, or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian operational environment monitor 4310 may monitor operational environment information corresponding to multiple pedestrian vehicle operational scenarios, the intersection operational environment monitor 4320 may monitor operational environment information corresponding to multiple intersection vehicle operational scenarios, and the lane change operational environment monitor 4330 may monitor operational environment information corresponding to multiple lane change vehicle operational scenarios.

An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the pedestrian operational environment monitor 4310 may receive, or otherwise access, information, such as sensor data, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, an aspect of the vehicle transportation network geometry, or the like.

An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information.

An operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the blocking monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor data, from one or more sensors, which may correspond to one or more pedestrians. The pedestrian operational environment monitor 4310 may associate the sensor data with one or more identified pedestrians, which may include may identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

The intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment, to identify vehicle transportation network geometry, or a combination thereof. For example, the intersection operational environment monitor 4320 may receive information, such as sensor data, from one or more sensors, which may correspond to one or more remote vehicles in the operational environment, the intersection, or one or more aspects thereof, in the operational environment, the vehicle transportation network geometry, or a combination thereof. The intersection operational environment monitor 4320 may associate the sensor data with one or more identified remote vehicles in the operational environment, the intersection, or one or more aspects thereof, in the operational environment, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

The lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the vehicle, to identify one or more aspects of the operational environment, such as vehicle transportation network geometry in the operational environment, or a combination thereof geospatially corresponding to a current or expected lane change operation. For example, the lane change operational environment monitor 4330 may receive information, such as sensor data, from one or more sensors, which may correspond to one or more remote vehicles in the operational environment of the autonomous vehicle, one or more aspects of the operational environment, or a combination thereof geospatially corresponding to a current or expected lane change operation. The lane change operational environment monitor 4330 may associate the sensor data with one or more identified remote vehicles in the operational environment of the autonomous vehicle, one or more aspects of the operational environment, or a combination thereof geospatially corresponding to a current or expected lane change operation, which may include identifying a current or expected direction of travel, a path, such as an expected path, a current or expected velocity, a current or expected acceleration rate, or a combination thereof for one or more of the respective identified remote vehicles. The lane change operational environment monitor 4330 may output the identified, associated, or generated lane change information to, or for access by, the autonomous vehicle operational management controller 4100.

The autonomous vehicle operational management controller 4100 may identify one or multiple distinct vehicle operational scenarios based on one or more aspects of the operational environment represented by the operational environment information. The autonomous vehicle operational management controller 4100 may identify a distinct vehicle operational scenario in response to identifying, or based on, the operational environment information indicated by one or more of the operational environment monitors 4300. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the SSOCEMs 4400 based on one or more aspects of the operational environment represented by the operational environment information. For example, the autonomous vehicle operational management controller 4100 may instantiate a respective instance of a SSOCEM 4400 in response to identifying an upcoming scenario. An upcoming scenario may be a distinct vehicle operational scenario that the autonomous vehicle operational management controller 4100 determines that the autonomous vehicle is likely to encounter if it continues in its path. Upcoming scenarios may be expected (e.g., can be determined from the route of the autonomous vehicle) or unexpected. An unexpected upcoming scenario may be a scenario that can be detected by the sensors of the vehicle and cannot be determined without sensor data.

A SSOCEM 4400, once instantiated, can receive the operational environment information, including sensor data, to determine and output a candidate vehicle control action, also called a candidate action herein. A candidate action is a vehicle control action that is identified by the particular SSOCEM 4400 as the likely optimal action for the vehicle to perform that will handle a particular scenario. For instance, a SSOCEM 4400 configured to handle intersections (e.g., an intersection SSOCEM 4420) may output a "proceed," a candidate action that suggests proceeding through an intersection. At the same time, a SSOCEM 4400 for handling lane changes (e.g., the lane change SSOCEM 4430) may output a "turn left" candidate action indicating that the vehicle should merge left by two degrees. In some implementations, each SSOCEM 4400 outputs a confidence score indicating a degree of confidence in the candidate action determined by the SSOCEM 4400. For instance, a confidence score greater than 0.95 may indicate a very high confidence in the candidate action, while a confidence score less than 0.5 may indicate a relatively low degree of confidence in the candidate action. Further details of a SSOCEM 4400 are described below.

The autonomous vehicle operational management controller 4100 receives the candidate actions and determines a vehicle control action based on the received candidate actions. In some implementations, the autonomous vehicle operational management controller 4100 utilizes hardcoded logic to determine the vehicle control action. For example, the autonomous vehicle operational management controller 4100 may select the candidate action having the highest confidence score. In other implementations, the autonomous vehicle operational management controller 4100 may select the candidate action that is the least likely to result in a collision. In other implementations, the autonomous vehicle operational management controller 4100 may generate a compound action based on two or more non-conflicting candidate actions (e.g., compounding 'proceed' and 'turn left by two degrees' to result in a vehicle control action that causes the vehicle to veer left and proceed through an intersection). In some implementations, the autonomous vehicle operational management controller 4100 may utilize a machine learning algorithm to determine a vehicle control action based on two or more differing candidate actions.

For example, identifying the vehicle control action from the candidate actions may include implementing a machine learning component, such as supervised learning of a classification problem, and training the machine learning component using examples, such as 1000 examples, of the corresponding vehicle operational scenario. In another example, identifying the vehicle control action from the candidate actions may include implementing a Markov Decision Process, or a Partially Observable Markov Decision Processes, which may describe how respective candidate actions affect subsequent candidate actions affect, and may include a reward function that outputs a positive or negative reward for respective vehicle control actions.

The autonomous vehicle operational management controller 4100 may uninstantiate an instance of a SSOCEM 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The blocking monitor 4200 may receive operational environment information representing an operational environment, or an aspect thereof, for the vehicle. For example, the blocking monitor 4200 may receive the operational environment information from the autonomous vehicle operational management controller 4100, from a sensor of the vehicle, from an external device, such as a remote vehicle or an infrastructure device, or a combination thereof. The blocking monitor 4200 may read the operational environment information, or a portion thereof, from a memory, such as a memory of the autonomous vehicle, such as the memory 1340 shown in FIG. 1.

The blocking monitor 4200 may determine a respective probability of availability, or corresponding blocking probability, for one or more portions of the vehicle transportation network. The portions may include those portions of the vehicle transportation network corresponding to an expected path of the autonomous vehicle.

A probability of availability, or corresponding blocking probability, may indicate a probability or likelihood that the autonomous vehicle will traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of availability for the portion of the vehicle transportation network may be low, such as 0%, which may be expressed as a high blocking probability, such as 100%, for the portion of the vehicle transportation network. The blocking monitor 4200 may identify a respective probability of availability for each of multiple portions of the vehicle transportation network within an operational environment, such as within 300 meters, of the autonomous vehicle.

A probability of availability may be indicated by the blocking monitor 4200 corresponding to each external object in the operational environment of the autonomous vehicle and a geospatial area may be associated with multiple probabilities of availability corresponding to multiple external objects. An aggregate probability of availability may be indicated by the blocking monitor 4200 corresponding to each type of external object in the operational environment of the autonomous vehicle, such as a probability of availability for pedestrians and a probability of availability for remote vehicles, and a geospatial area may be associated with multiple probabilities of availability corresponding to multiple external object types.

The blocking monitor 4200 may identify external objects, track external objects, project location information, path information, or both for external objects, or a combination thereof. For example, the blocking monitor 4200 may identify an external object and identify an expected path for the external object based on operational environment information (e.g., a current location of the external object), information indicating a current trajectory and/or speed for the external object, information indicating a type of classification of the external object (e.g., a pedestrian or a remote vehicle), vehicle transportation network information (e.g., a crosswalk proximate to the external object), previously identified or tracked information associated with the external object, or any combination thereof. The expected path may indicate a sequence of expected spatial locations, expected temporal locations, and corresponding probabilities.

The blocking monitor 4200 may communicate probabilities of availability, or corresponding blocking probabilities, to the autonomous vehicle operational management controller 4100. The autonomous vehicle operational management controller 4100 may communicate the probabilities of availability, or corresponding blocking probabilities, to respective instantiated instances of the scenario-specific operational control evaluation modules 4400.

Although not expressly shown in FIG. 4, the autonomous vehicle operational management system 4000 may include a predictor module that may generate and send prediction information to the blocking monitor 4200, and the blocking monitor 4200 may output probability of availability information to one or more of the operational environment monitors 4300.

Each SSOCEM 4400 may model a respective distinct vehicle operational scenario. The autonomous vehicle operational management system 4000 includes any number of SSOCEMs 4400, each modeling a respective distinct vehicle operational scenario. Modeling a distinct vehicle operational scenario may include generating and/or maintaining state information representing aspects of an operational environment of the vehicle corresponding to the distinct vehicle operational scenario, identifying potential interactions among the modeled aspects respective of the corresponding states, and determining a candidate action that solves the model. Stated more simply, a SSOCEM 4400 may include one or more models that are configured to determine one or more vehicle control actions for handling a scenario given a set of inputs. The models may include, but are not limited to, Partially Observable Markov Decision Process (POMDP) models, Markov Decision Process (MDP) models, Classical Planning (CP) models, Partially Observable Stochastic Game (POSG) models, Decentralized Partially Observable Markov Decision Process (Dec-POMDP) models, Reinforcement Learning (RL) models, artificial neural networks, hardcoded expert logic, or any other suitable types of models. Examples of different types of models are provided below. Each SSOCEM 4400 includes computer-executable instructions that define a manner by which the models operate and a manner by which the models are utilized.

A SSOCEM 4400 may implement a CP model, which may be a single-agent model that models a distinct vehicle operational scenario based on a defined input state. The defined input state may indicate respective non-probabilistic states of the elements of the operational environment of the autonomous vehicle for the distinct vehicle operational scenario. In a CP model, one or more aspects (e.g., geospatial location) of modeled elements (e.g., external objects) that are associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distances, such as a defined number of meters, along an expected path for the remote vehicle.

A SSOCEM 4400 may implement a discrete time stochastic control process, such as a MDP model, which may be a single-agent model that model a distinct vehicle operational scenario based on a defined input state. Changes to the operational environment of the autonomous vehicle, such as a change of location for an external object, may be modeled as probabilistic changes. A MDP model may utilize more processing resources and may more accurately model the distinct vehicle operational scenario than a CP model.

A MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state represent an identified condition, which may be an expected condition, of respective defined aspects, such as external objects and traffic control devices, of the operational environment of the vehicle that may probabilistically affect the operation of the vehicle at a discrete temporal location. For example, a remote vehicle operating in the proximity of the vehicle may affect the operation of the vehicle and may be represented in a MDP model. The MDP model may include representing the following identified or expected information for the remote vehicle: its geospatial location, its path, heading, or both, its velocity, its acceleration or deceleration rate, or a combination thereof corresponding to a respective temporal location. At instantiation, the current state of the MDP model may correspond to a contemporaneous state or condition of the operating environment.

Although any number or cardinality of states may be used, the number or cardinality of states included in a model may be limited to a defined maximum number of states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the vehicle, as represented by the states, responsive to the actions. For example, a state transition probability may indicate a probability that the operational environment corresponds to a respective state at a respective temporal location immediately subsequent to a current temporal location corresponding to a current state in response to traversing the vehicle transportation network by the vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

Examples of state transition probabilities associated with a pedestrian vehicle operational scenario may include a defined probability of a pedestrian jaywalking (e.g., based on a geospatial distance between the pedestrian and the respective road segment); a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with an intersection vehicle operational scenario.

Examples of state transition probabilities associated with a lane change vehicle operational scenario may include a defined probability of a remote vehicle changing velocity, such as a defined probability of a remote vehicle behind the vehicle increasing velocity or a defined probability of a remote vehicle in front of the vehicle decreasing velocity; a defined probability of a remote vehicle in front of the vehicle changing lanes; a defined probability of a remote vehicle proximate to the vehicle changing speed to allow the vehicle to merge into a lane; or any other probabilities associated with a lane change vehicle operational scenario.

The reward function may determine a respective positive or negative (cost) value accrued for each combination of state and action. This accrual represents an expected value of the vehicle traversing the vehicle transportation network from the corresponding state in accordance with the corresponding vehicle control action to the subsequent state.

The reward function may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the vehicle.

A SSOCEM 4400 may implement a POMDP model, which may be a single-agent model. A POMDP model is similar to a MDP model, except that a POMDP model includes modeling uncertain states. A POMDP model may include modeling confidence, sensor trustworthiness, distraction, noise, uncertainty, such as sensor uncertainty, or the like. A POMDP model may utilize more processing resources and may more accurately model the distinct vehicle operational scenario than a MDP model.

A POMDP model may model a distinct vehicle operational scenario using a set of states, a set of states, a set of actions, a set of state transition probabilities, a reward function, a set of observations, a set of conditional observation probabilities, or a combination thereof. The set of states, the set of actions, the set of state transition probabilities, and the reward function may be similar to those described above with respect to the MDP model.

The set of observations may include observations corresponding to respective states. An observation may provide information about the attributes of a respective state. An observation may correspond with a respective temporal location. An observation may include operational environment information, such as sensor data. An observation may include expected or predicted operational environment information.

For example, a POMDP model may include an autonomous vehicle at a first geospatial location and first temporal location corresponding to a first state. The model may indicate that the vehicle identify and perform, or attempt to perform, a vehicle control action to traverse the vehicle transportation network from the first geospatial location to a second geospatial location at a second temporal location immediately subsequent to the first temporal location. The set of observations corresponding to the second temporal location may include the operational environment information that is identified corresponding to the second temporal location, such as geospatial location information for the vehicle, geospatial location information for one or more external objects, probabilities of availability, expected path information, or the like.

The set of conditional observation probabilities may include probabilities of making respective observations based on the operational environment of the autonomous vehicle. For example, the autonomous vehicle may approach an intersection by traversing a first road, contemporaneously, a remote vehicle may approach the intersection by traversing a second road, the autonomous vehicle may identify and evaluate operational environment information, such as sensor data, corresponding to the intersection, which may include operational environment information corresponding to the remote vehicle. The operational environment information may be inaccurate, incomplete, or erroneous. In a MDP model, the autonomous vehicle may non-probabilistically identify the remote vehicle, which may include identifying its location, an expected path, or the like, and the identified information, such as the identified location, based on inaccurate operational environment information, may be inaccurate or erroneous. In a POMDP model, the autonomous vehicle may identify information probabilistically identifying the remote vehicle, such as probabilistically identifying location information for the remote vehicle. The conditional observation probability corresponding to observing, or probabilistically identifying, the location of the remote vehicle represents the probability that the identified operational environment information accurately represents the location of the remote vehicle.

The set of conditional observation probabilities may be identified based on the operational environment information, such as the operational environment information described with respect to the reward function.

A SSOCEM 4400 may implement a Dec-POMDP model, which may be a multi-agent model that models a distinct vehicle operational scenario. A Dec-POMDP model may be similar to a POMDP model except that a POMDP model models the vehicle and a proper subset, such as one, of external objects and a Dec-POMDP models the autonomous vehicle and the set of external objects.

A SSOCEM 4400 may implement a POSG model, which may be a multi-agent model that models a distinct vehicle operational scenario. A POSG model may be similar to a Dec-POMDP except that the Dec-POMDP model includes a reward function for the vehicle and the POSG model includes the reward function for the vehicle and a respective reward function for each external object.

A SSOCEM 4400 may implement a RL model, which may be a learning model that models a distinct vehicle operational scenario. A RL model may be similar to a MDP model or a POMDP model except that defined state transition probabilities, observation probabilities, a reward function, or any combination thereof, may be omitted from the model. Instead, for example, the RL model may be a model-based RL model that generates state transition probabilities, observation probabilities, a reward function, or any combination thereof based on one or more modeled or observed events.

In a RL model, the model may evaluate one or more events or interactions, which can include simulated events, and may generate, or modify, a corresponding model, or a solution thereof, in response to the respective event. Simulated events may include, for example, traversing an intersection, traversing a vehicle transportation network near a pedestrian, or changing lanes. An example of using a RL model to traverse an intersection includes the RL model indicating a candidate action for traversing the intersection. The autonomous vehicle then traverses the intersection using the candidate action as the vehicle control action for a temporal location. A result of traversing the intersection using the candidate action may be determined to update the RL model based on the result.

The autonomous vehicle operational management system 4000 may include any number or combination of types of models. For example, the pedestrian SSOCEM 4410, the intersection SSOCEM 4420, and the lane change SSOCEM 4430 may implement POMDP models. In another example, the pedestrian SSOCEM 4410 may implement a MDP model and the intersection SSOCEM 4420 and the lane change SSOCEM 4430 may implement POMDP models. Further, the autonomous vehicle operational management controller 4100 may instantiate any number of instances of the SSOCEMs 4400 based on the operational environment information. A module 4440 is shown using broken lines to indicate that the autonomous vehicle operational management system 4000 may include any number or additional types of SSOCEMs 4400.

One or more of the autonomous vehicle operational management controller 4100, the blocking monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the blocking monitor 4200, the operational environment monitors 4300, or the SSOCEMs 4400 may be independent of the operational rate of others.

Figure 5:
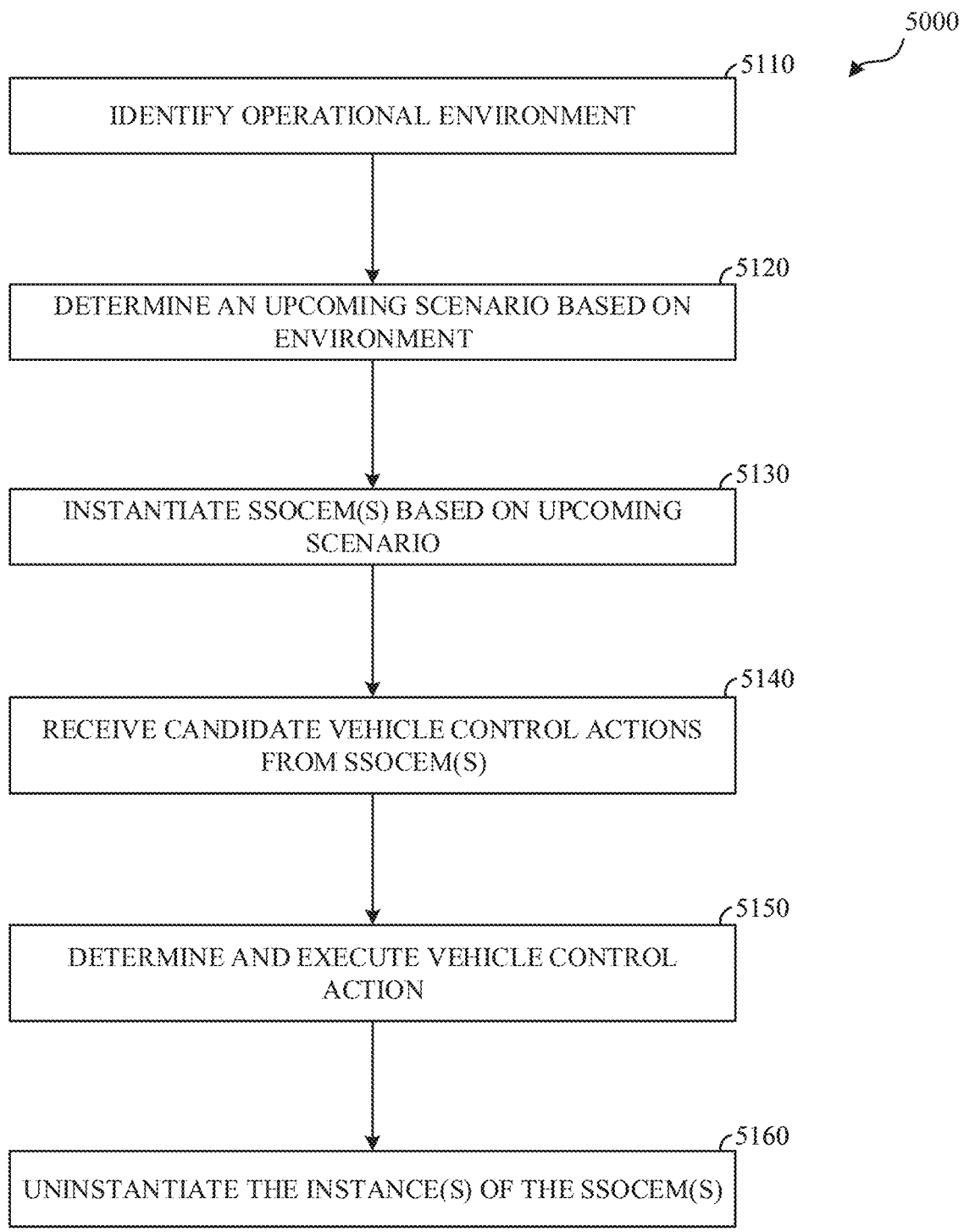
FIG. 5 is a flow chart diagram of an example of a technique for controlling the operation of a vehicle in accordance with embodiments of this disclosure.

FIG. 5 is a flow chart diagram of an example of a technique 5000 for controlling the operation of a vehicle in accordance with embodiments of this disclosure. The technique 5000 of FIG. 5 is described with respect to the autonomous vehicle operational management controller 4100. The technique 5000 may, however, be executed by any other suitable component.

Although not shown separately in FIG. 5, the autonomous vehicle operational management controller 4100 may identify the operational environment of the autonomous vehicle, or defined aspects thereof, at 5110 while traveling along a route from a current location to a destination. Identifying the operational environment at 5110 can include identifying and tracking external objects. In an example, the external objects can be identified and tracked by a world modeling module (not shown).

The world modeling module can track continuous world object states (e.g., object pose, velocity, geometry, etc.) and discrete world object states (e.g., object classification, intention, etc.); estimate and track multiple object state hypotheses (e.g., intentions, trajectories, etc.) with associated probabilities (e.g., likelihoods); generate and track abstract object intentions, depending on object state, map and/or environmental information; predict future object states with multiple hypotheses for a variable-length of time; and perform real-time processing and fuse data from various sensors (e.g., LiDAR, radar, camera, etc.).

The identified operational environment may include vehicle information for the vehicle, information representing the vehicle transportation network proximate to the vehicle, information representing external objects, etc. The autonomous vehicle operational management controller 4100 may identify the operational environment at 5110 based on sensor data, such as from the sensor 1360 shown in FIG. 1 or the on-vehicle sensors 2105 shown in FIG. 2, vehicle transportation network information, previously identified operational environment information, or any other information or combination of information describing an aspect or aspects of the operational environment.

An external object indicated by the sensor data may be indeterminate, and the autonomous vehicle operational management controller 4100 may identify object information, such as an object type, based on the sensor data, other information, such as information from another sensor, information corresponding to a previously identified object, or a combination thereof. The sensor, or another unit of the vehicle may identify the object information and may send the object identification information to the autonomous vehicle operational management controller 4100.

At 5120, the autonomous vehicle operational management controller 4100 determines an upcoming scenario. The autonomous vehicle operational management controller 4100 may determine an upcoming scenario by detecting an upcoming scenario itself or may pass the operational environment to one or more of the operational environment monitors 4300 and receive an upcoming scenario detected by a respective operational environment monitor 4300.

Where the autonomous vehicle operational management controller 4100 is used to detect an upcoming scenario, the autonomous vehicle operational management controller 4100 may include one or more scenario-specific monitor module instances. For example, the autonomous vehicle operational management controller 4100 may include such instances for monitoring pedestrians, intersections, lane changes, or a combination thereof. Each scenario-specific monitor module instance may use the operational environment information to determine an upcoming scenario by, for example, identifying whether a pedestrian is within a defined distance of the vehicle, whether the vehicle is approaching an intersection, a crosswalk, or both, whether the vehicle is traveling in a passing lane, etc.

Where the autonomous vehicle operational management controller 4100 passes the operational environment to one or more of the operational environment monitors 4300, similar processing occurs. For instance, the intersection operational environment monitor 4320 may identify, for an upcoming intersection, a type of intersection. For example, the intersection operational environment monitor 4320 may determine the number of roads intersecting, the right of way (if any), whether there are stop signs or traffic signals, and whether there is a crosswalk at the intersection. Each operational environment monitor 4300 may output zero or more upcoming scenarios to the autonomous vehicle operational management controller 4100. Each upcoming scenario may include a geolocation of the upcoming scenario and a type of the upcoming scenario. In some implementations, the type of the upcoming scenario may include one or more data fields that define the features of the upcoming scenario.

In some situations during travel, the autonomous vehicle operational management controller 4100 determines multiple distinct vehicle operational scenarios, which may be aspects of a compound vehicle operational scenario, at 5120. For example, the operational environment information may include information representing a pedestrian approaching an intersection along an expected path for the vehicle, so a pedestrian vehicle operational scenario, an intersection vehicle operational scenario, or both are determined at 5120. The operational environment may include multiple external objects such that the autonomous vehicle operational management controller 4100 identifies a distinct vehicle operational scenario corresponding to each external object at 5120.

At 5130, the autonomous vehicle operational management controller 4100 instantiates one or more SSOCEMs 4400 based on the upcoming scenario(s). In instantiating a SSOCEM 4400, the autonomous vehicle operational management controller 4100 may pass the geolocation of the upcoming scenario, the current location of the vehicle, and a type of the upcoming scenario to the instance of the SSOCEM 4400. Where more than one SSOCEM 4400 is instantiated at 5130, each SSOCEM instance can correspond to a respective distinct vehicle operational scenario determined at 5120, or a combination of a distinct external object identified in the operational environment at 5110 and a respective distinct vehicle operational scenario determined at 5120.

Although not shown in FIG. 5, the autonomous vehicle operational management controller 4100 may send the operational environment for the vehicle identified at 5110 to a blocking monitor, such as the blocking monitor 4200. The blocking monitor 4200 may then in turn determine a respective probability of availability, or corresponding blocking probability, for one or more portions of the vehicle transportation network, such as portions of the vehicle transportation network corresponding to an expected path of the vehicle (e.g., an expected path identified based on a current route of the autonomous vehicle), an expected path for one or more external objects, etc., and send the probabilities for use in the instantiated SSOCEM(s).

At 5140, the autonomous vehicle operational management controller 4100 receives a candidate action from one or more of the instantiated SSOCEMs. As each SSOCEM may be configured to handle a specific scenario, different SSOCEMs may provide different candidate actions. For instance, a first SSOCEM instance may output a candidate action to stop the vehicle, while a second SSOCEM instance may output a candidate action to decelerate the vehicle.

The SSOCEM instance(s) may solve a model of a corresponding distinct vehicle operational scenario to provide the candidate actions. Solving the model depends on the type of model. For example, where the model for a SSOCEM instance is a POMDP, the solution may determine a set of possible states and state transitions that correspond to vehicle control actions. A model may be considered fully solved when the model converges. A POMDP is defined by a tuple <S, A, $\Omega$, T, O, R>, where S is the set of possible states, A is a set of possible actions, and $\Omega$ is a set of observations. T: S×A×S→[0, 1] describes how the environmental states change dynamically with respect to the actions taken by the vehicle. O: A×S×$\Omega$→[0, 1] describes how observations are stochastically produced by new environment states once an action has been taken by the vehicle. R is the reward function, which may be defined as a unit cost for all states, except the goal state. Given the definition of a POMDP, the SSOCEM instance may solve the POMDP by constructing a policy that maximizes an objective function (such as avoiding a pedestrian that may wish to cross the path of the vehicle, or traversing an intersection in the presence of an external objects, such as a remote vehicle). The objective function combines partial rewards (at each step) over multiple steps. At each step, the SSOCEM instance determines whether a state transition, which may be a transition from one state to another state resulting from an action, results in a reward or a penalty. This determination (i.e., reward or penalty) may be used to update the objective function (e.g., decrement the objective function in the case of a penalty and increment the objective function in the case of reward). Thus, the SSOCEM instance iterates through all the possible state transitions while updating the objective function at each step. At each step (or every nth step), the SSOCEM instance can determine whether the objective function is increasing, decreasing, or remaining relatively flat. After observing little or no change in the objective function over multiple steps, the SSOCEM 4400 determines that the solution to the POMDP has converged. The output may comprise the candidate action(s) sent to the autonomous vehicle operational management controller 4100.

At 5150, the autonomous vehicle operational management controller 4100 determines and executes a vehicle control action. The autonomous vehicle operational management controller 4100 may utilize any suitable technique to determine a vehicle control action based on the one or more candidate actions. The autonomous vehicle operational management controller 4100 may implement hard-coded instructions to determine a vehicle control action. For instance, each candidate vehicle control action may have a confidence score associated therewith, and the autonomous vehicle operational management controller 4100 may be configured to select the candidate vehicle control action having the highest confidence score. The autonomous vehicle operational management controller 4100 may select the candidate vehicle control action that is the least likely to cause a collision. The autonomous vehicle operational management controller 4100 may utilize a machine learned model to select the vehicle control action from a set of candidate actions. The autonomous vehicle operational management controller 4100 may group of the candidate actions, and select one or more candidate actions having a highest count as the vehicle control action.

However the vehicle control action is determined, the autonomous vehicle operational management controller 4100 may execute the vehicle control action. For example, the autonomous vehicle operational management controller 4100 may determine one or more commands for one or more of the vehicle systems (e.g., the chassis system, braking system, steering system, and/or propulsion systems) to perform. Once determined, the autonomous vehicle operational management controller 4100 may issue the determined commands to the respective vehicle systems.

At 5160, the autonomous vehicle operational management controller 4100 may uninstantiate the instance(s) of the SSOCEM(s). Once a particular scenario is handled, the autonomous vehicle operational management controller may uninstantiate any instances of SSOCEMs that were instantiated to handle the scenario. For example, the intersection SSOCEM 4420 may be instantiated when the distance of the autonomous vehicle to the intersection is 50 meters and may be uninstantiated when the vehicle is on the other side of the intersection. As another example, the pedestrian SSOCEM 4410 may be instantiated when the autonomous vehicle approaches a pedestrian or an occluded region of interest (as discussed in additional detail with regard to FIG. 6) and may be uninstantiated when the vehicle has passed the pedestrian or region. As yet another example, the lane change SSOCEM 4430 may be instantiated when the route of the autonomous vehicle requires a lane change, or there is a region-specific preference for a certain lane and may be uninstantiated once the lane change is complete, or the road/route/location changes to make a lane change unnecessary.

Although not expressly shown in FIG. 5, the autonomous vehicle operational management controller 4100 may continuously or periodically repeat identifying or updating the operational environment information at 5110 to determine when a distinct vehicle operational scenario is resolved and hence may be uninstantiated at 5160, or to determine whether a new scenario has appeared that makes the addition of a further SSOCEM instance desirable. To the extent a scenario remains unresolved, the operational environment information may be transmitted to the SSOCEM instances.

Figure 6:
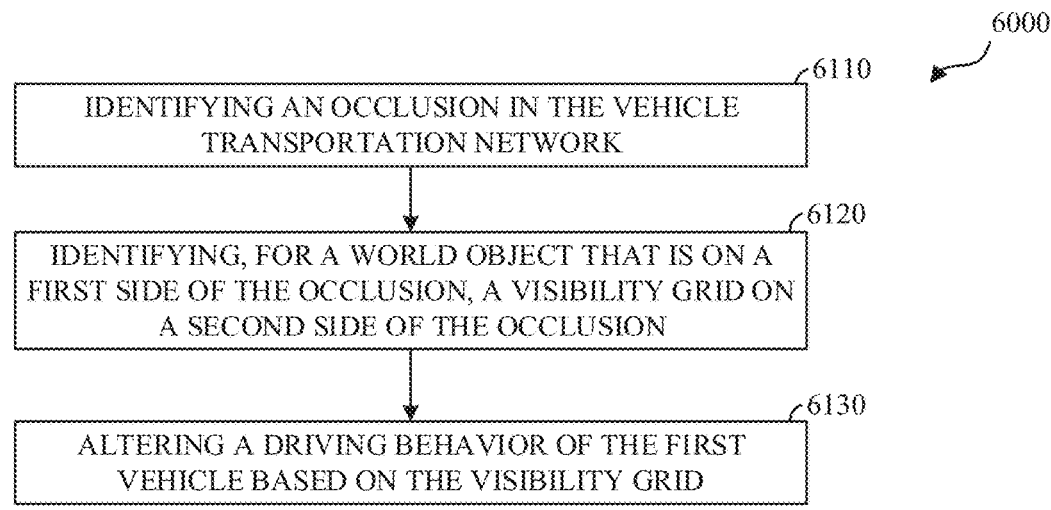
FIG. 6 is a flow chart diagram of a technique for traversing a vehicle transportation network using 3D occlusions reasoning for accident avoidance in accordance with embodiments of this disclosure.

A vehicle may be one side of an obstruction. As mentioned above, instead of assuming that another side of the obstruction is completely unobserved and, therefore, it is possible that an external object such as a vehicle or a pedestrian is unobserved, in some situations, it can be determined with certainty whether an external object exists on the other side. A technique for addressing such situations by determining a visibility grid is described with respect to FIG. 6. More specifically, FIG. 6 is a flow chart diagram of a technique 6000 for traversing a vehicle transportation network using 3D occlusions reasoning for accident avoidance in accordance with embodiments of this disclosure.

Some or all of the operations of the technique 6000 may be implemented by a SSOCEM 4400 that models occlusions, or by another component of the autonomous vehicle operational management system 4000 that provides a probability of the existence of an unobserved object to one or more of the SSOCEMs 4400, such as the pedestrian SSOCEM 4410, the intersection SSOCEM 4420, and/or the lane change SSOCEM 4430 depending upon the class of the unobserved object (e.g., a pedestrian or a remote vehicle). For example, an operational environment monitor 4300 may identify occlusions, may identify or determine a certainty or a probability that an external object is occluded, or hidden, and may include occluded vehicle certainty or probability information in the operational environment information output to the autonomous vehicle operational management controller 4100 that is communicated to a respective SSOCEM 4400. Because a POMDP model, and its other variations described above, allow for the modeling of uncertain states, it is desirable in the SSOCEM 4400 implements one of these models.

At 6110, the technique 6000 identifies an occlusion in the vehicle transportation network. The occlusion can be an external object, such as a traffic sign, a building, a tree, an identified external object, or any other operational condition or combination of operational conditions capable of occluding one or more other operational conditions, such as external objects, from the autonomous vehicle at a spatiotemporal location within a sensor range.

In an example, the occlusion can be identified using sensor data for a portion of a vehicle operational environment. The sensor data can be received from a sensor of the vehicle. The sensor data may be part of the information for the operational environment that is identified at 5110. The sensor may be a LiDAR sensor or a depth-sensing camera, for example. Other sensors, such as RADAR or sonar, may be used as the sensor. In some implementations, more than one or multiple types of sensors may be used.

In an example, the occlusion can be identified using map information. For example, using the location of the vehicle, a map (e.g., a high-definition map) can be used to identify the occlusion. In an example, the map can be a point cloud map of the portion of the vehicle transportation network. For example, the map can be a point cloud map of an entire city that includes the portion of the vehicle transportation network.

At 6120, the technique 6000 identifies, for a world object that is on a first side of the occlusion, a visibility grid on a second side of the occlusion. The second side is different from the first side. It is noted that the visibility grid is not limited to the second side. The second side can be a combination of sides. For example, assume that the occlusion has four sides A, B, C, and D, and assume further that the world object is on side A, then the second side can be any combination of the B, C, and D side. The second side can be a side that is occluded from the world object by the occlusion. As further described below, the visibility information can be used in determining whether other world objects exist on the second side of the occlusion.

In an example, the visibility grid can include at least one of observed coordinates, or unobserved coordinates (collectively, coordinates). Observed coordinates are coordinates of locations that are visible to the sensor, even though they are on the second side of the occlusion. Unobserved coordinates are coordinates of locations that are not visible to the sensor because they are hidden (e.g., occluded) by the occlusion. Observed coordinates can form one or more observed regions of the region of interest. Unobserved coordinates can form one or more unobserved regions of the region of interest. Observed and unobserved regions are explained with reference to FIGS. 7-8.

Figure 7A:
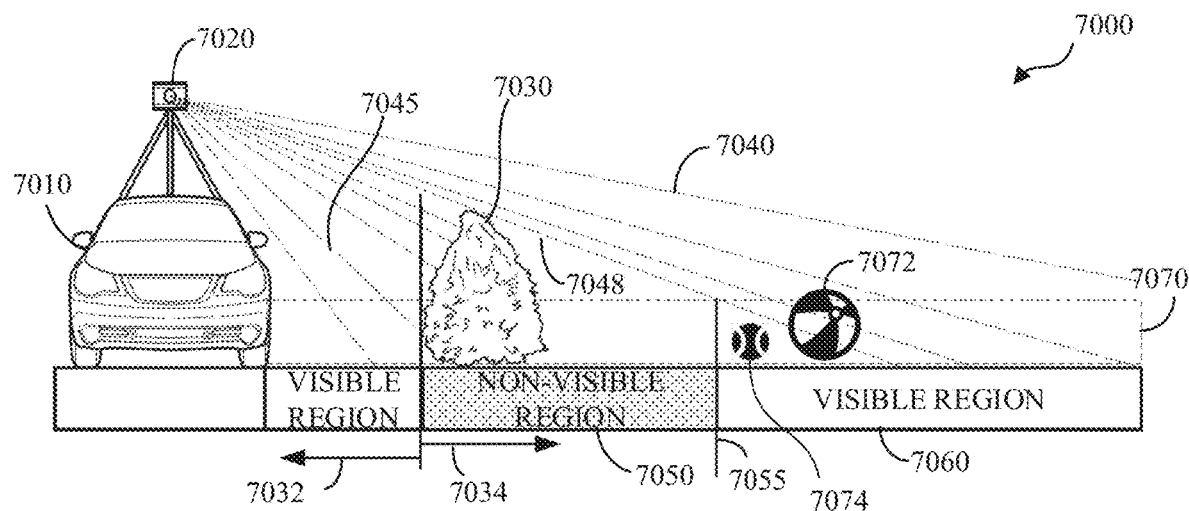
FIG. 7A is a diagram of observed and unobserved regions used to explain the technique of FIG. 6.

FIG. 7A is a diagram 7000 of observed and unobserved regions used to explain the process of FIG. 6. The diagram 7000 illustrates a vehicle 7010 that includes a sensor 7020 that is mounted on top of the vehicle 7010. The sensor 7020 in this example is a LiDAR. However, other sensor types are possible. The diagram 7000 includes an occlusion 7030. The vehicle 7010 is on a first side 7032 of the occlusion 7030. The visibility grid is determined with respect to a second side 7034 of the occlusion 7030.

Laser beams, such as beams 7040, 7045 are emitted from the sensor 7020. The laser beams can be emitted at different angles from the center of the sensor 7020 according to a configuration of the sensor 7020. The visibility grid can be determined by performing a 3D ray tracing from the origin at the center of the sensor 7020 out at every angle at which the laser is emitted. The technique of ray tracing can be used to determine which regions on the second side of the occlusion 7030 are visible (e.g., unobstructed, observed) and which are not visible (e.g., obstructed, unobserved).

The diagram 7000 of FIG. 7A illustrates that a region 7050 is a non-visible area. As such, the vehicle 7010 (i.e., a module therein) cannot determine whether any external objects exist in the region 7050. Said another way, the vehicle 7010 can only probabilistically determine the existence of an external object in the region 7050. On the other hand, a region 7060 is a visible area. As such, the vehicle 7010 (i.e., a module therein) can determine with certainty whether any external objects exist in the region 7060.

A region of interest 7070 is a vertical z-height region. The region of interest 7070 is a z-height band above the ground in which is it desirable to determine whether there are objects. A location 7055 defines the location where a first non-blocked beam 7048 enters the region of interest 7070. Beams to the left of the first non-blocked beam 7048, such as the beam 7045, are blocked from entering the region of interest 7070 by the occlusion 7030.

In an example, it may not be necessary to determine whether visibility is possible in a certain region of interest that is a predetermined distance above the ground in the second side 7034 of the occlusion 7030. Determining a visibility grid may only be necessary where external objects of interest are likely to be and are of at least a certain height (e.g., the height of the region of interest). For example, it may not be necessary to determine visibility 5 centimeters (e.g., the predetermined distance) because vehicles, pedestrians, pets (e.g., dogs, cats, etc.), or other objects of interest would not be found in such as region of interest. Thus, the visibility grid can be identified with respect to a region of interest that is a predefined distance above ground.

To reiterate, by identifying a visibility grid with respect to the region of interest, it can be guaranteed that if there is an object at least as tall as the region of interest in a visible region of the region of interest, then the object will be seen by at least one laser beam. That is, at least one beam will hit the object and will be identified as a beam that hit an object that is as tall as the region of interest. However, it is noted that, given a certain z-height region of interest, it cannot be guarantee that objects that are shorter than the height of the region of interest shorter objects will be seen (i.e., will be visible). For example, a beach ball 7072, which is illustrated as having a diameter that is bigger than the height of the region of interest 7070, is visible, whereas a tennis ball 7074, which is illustrated as having a diameter that is much smaller than the height of the region of interest 7070, is not visible.

The z-height band can be adjacent to the ground or can be a band that is above ground (i.e., not adjacent to the ground). The height and location of the region of interest can affect the visibility grid (e.g., what areas and objects are visible). The region of interest can have different heights. The height of the region of interest can be selected such that it can be guaranteed that objects of a certain minimal heights can be detected in the visible areas of the region of interest.

Figure 7B:
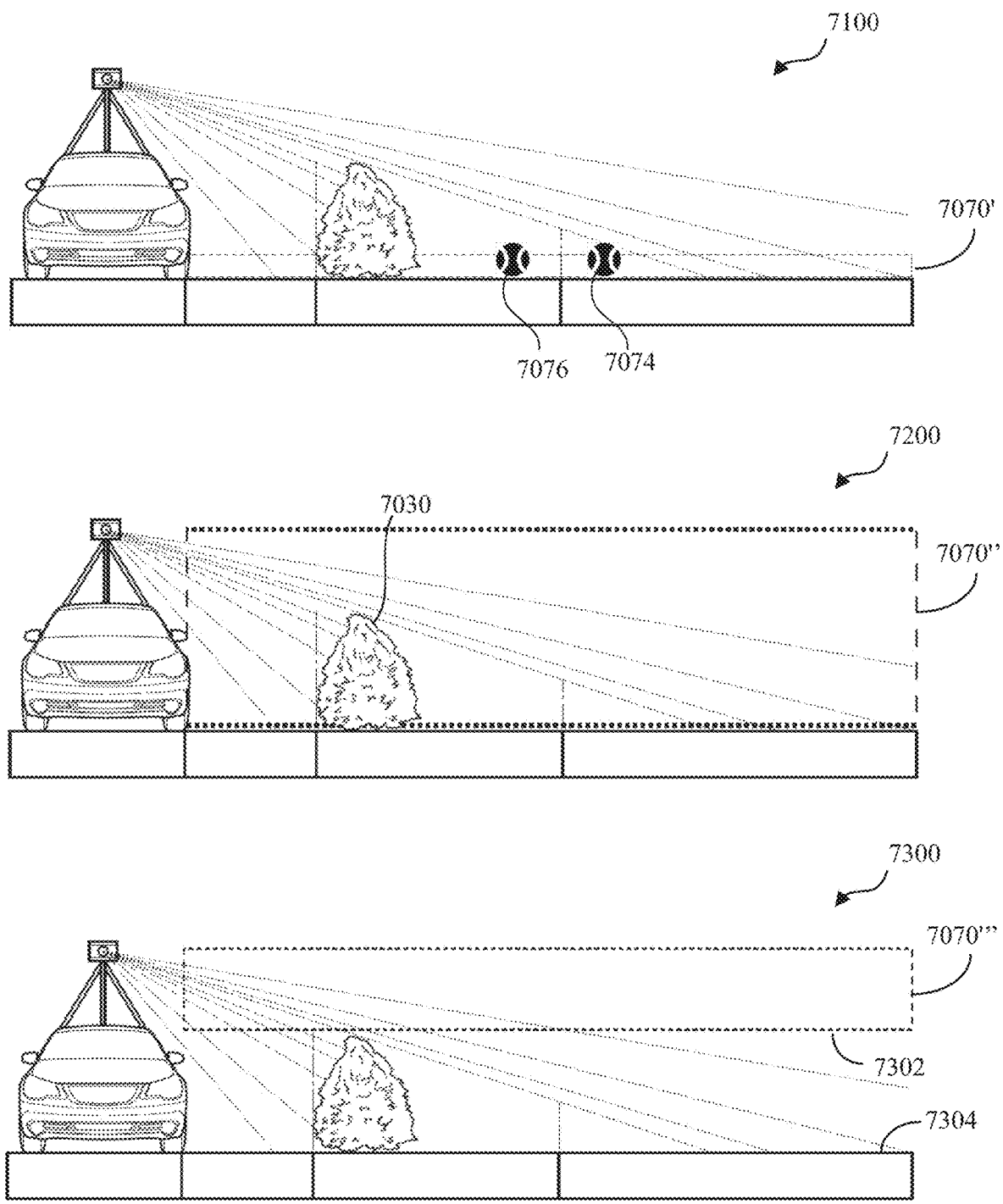
FIG. 7B illustrates different regions of interest in accordance with embodiments of this disclosure.

FIG. 7B illustrates different regions of interest in accordance with embodiments of this disclosure. Diagrams 7100, 7200, 7300 of FIG. 7B include the same elements as those in FIG. 7A. For brevity, not all the elements are numbered and described again with respect to FIG. 7B.

A diagram 7100 illustrates a region of interest 7070' that has a shorter height than that of the region of interest 7070 of FIG. 7A. The region of interest 7070' can be of such height as to guarantee that, in the visible part of the region of interest 7070', short objects, such as the tennis ball 7074, can be seen. That is, the height of the region of interest 7070' is selected to be lower than that of the region of interest 7070 of FIG. 7A such that it can be guaranteed that smaller objects can be visible. The guarantee is in the visible part of the region of interest 7070'. For example, a tennis ball 7076, which is in the invisible area of the region of interest 7070' is still not visible. Thus, in this example, a patch of ground can be considered to be visible only if objects as tall as the tennis ball can be seen on the ground.

A diagram 7200 illustrates a region of interest 7070" that has a height that is much bigger than that of the region of interest 7070 of FIG. 7A. The region of interest 7070" can be of such height that all of the beams, even the ones that are blocked by the occlusion 7030 enter the region of interest 7070". Therefore, the whole area can be considered to be visible. Thus, in this example, a patch of ground can be considered to be visible if, for example, objects as tall as trucks can be seen.

A diagram 7300 illustrates a region of interest 7070''' that is a floating region. As there are no occlusions in the diagram 7300, the whole of the region of interest 7070''' can be considered to be visible. A bottom end 7302 of the region of interest 7070''' is not at a ground plane 7304 (i.e., the top of the ground points). Such a floating region of interest can be used to determine visibility towards the sky (such as, for example, a region where drones may be hovering).

Determining the visibility grid can include 3D ray-tracing through a 3D volume of the second side, and marking regions of the second side (i.e., that are behind the occlusion and/or that are within some specified height above the ground) as either visible (e.g., unobscured) or non-visible (e.g., obscured), as the case may be. Anywhere where the laser beams do not enter the region of interest can be marked as non-visible (i.e., obstructed). Equivalently, the coordinates of those locations where the laser beams do not enter can be marked as unobserved. Anywhere where the laser beams enter the region of interest can be marked as visible (i.e., unobstructed). Equivalently, the coordinates of those locations where the laser beams enter can be marked as observed. In the second side 7034, laser beams of the sensor 7020 do not enter the region of interest in the region 7050 but do enter the region 7060. A region can be a collection of coordinates. Thus, regions can be formed by grouping coordinates together.

As can be appreciated, whether any region and/or which region(s) of the second side is visible can depend on the height, above ground, of the occlusion 7030 and the position, above ground, of the sensor 7020.

Figure 8:
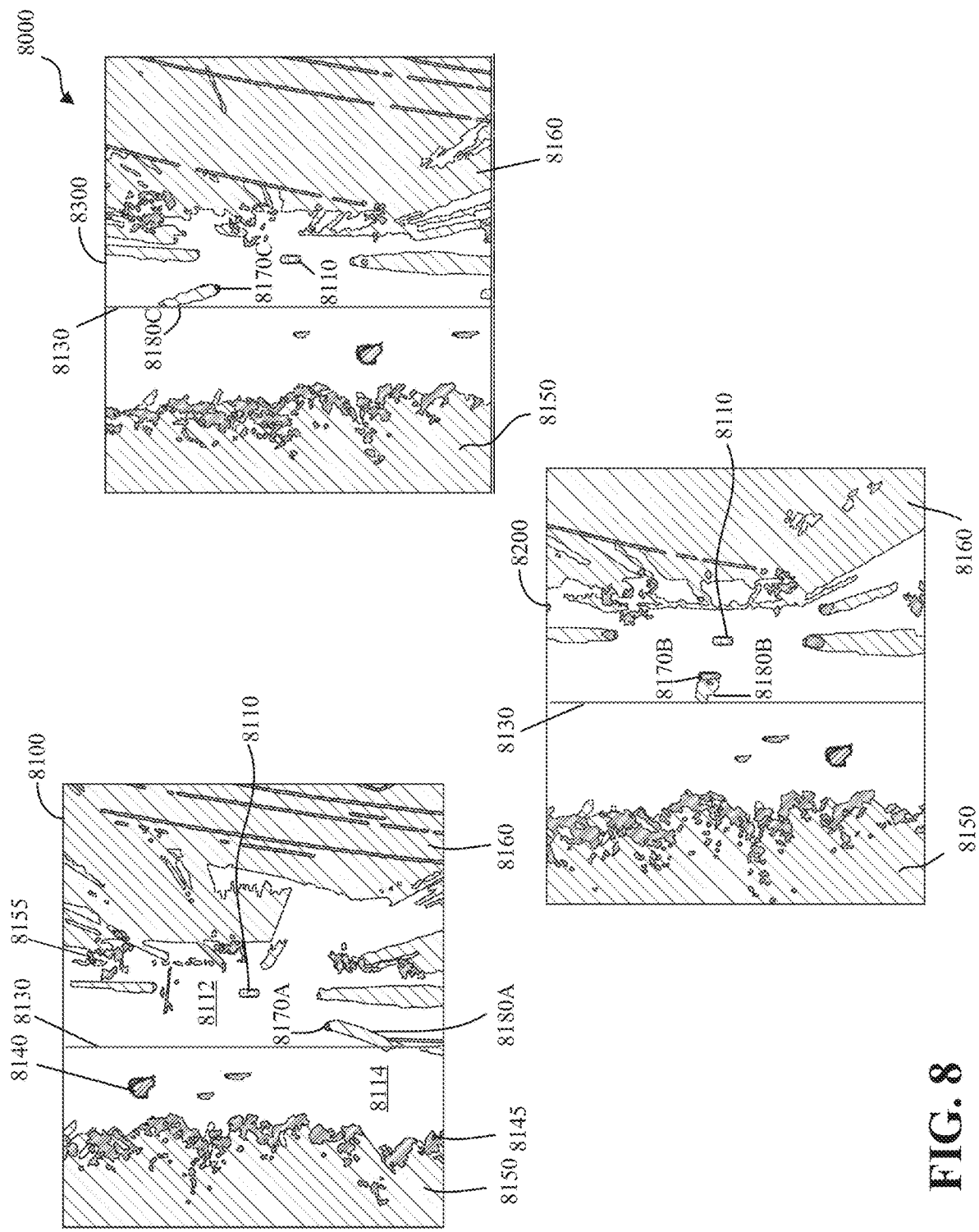
FIG. 8 is another diagram of observed and unobserved regions used to explain the technique of FIG. 6.

FIG. 8 is another diagram 8000 of observed and unobserved regions used to explain the technique of FIG. 6. The diagram 8000 illustrates a vehicle 8110 that is traveling in a South-to-North direction in a first lane 8112. The first lane 8112 is separated from a second lane 8114 (i.e., a North-to-South lane) by a line 8130. A point cloud 8140 illustrates a vehicle that is traveling in the second lane 8114. The diagram 8000 illustrates the vehicle 8110 at three different points in time, illustrated by scenes 8100, 8200, 8300.

The scenes 8100, 8200, 8300 illustrate bird-eye views of point clouds that are observed using a sensor (e.g., LiDAR) of the vehicle 8110 and visibility grids, which are calculated as described with respect to FIG. 7. A visibility grid 8150, along the left edge of each of the scenes 8100, 8200, 8300, illustrates that the vehicle 8110 cannot see on the second side of an occlusion 8145, which may be very dense trees. A visibility grid 8160 illustrates that the vehicle 8110 cannot see on the second side of an occlusion, which may be buildings. Clear (i.e., non-lined) areas of the scenes 8100, 8200, 8300 are visible areas (i.e., unobstructed).

In the scenes 8100, 8200, 8300, ground points have been removed. The points on the ground do not contribute to identifying external objects, such as vehicles, pedestrians, and other external objects. Ground points can be removed using any ground removal technique(s).

A vehicle 8170 is detected via the sensor of the vehicle 8110. The vehicle 8170 is traveling in the first lane 8112 along the same direction as that of the vehicle 8110. The vehicle 8170 is at a location 8170A in the scene 8100, at a location 8170B in the scene 8200, and at a location 8170C in the scene 8300. The vehicle 8170 causes different regions to become unobserved to the vehicle 8110, depending on the location of the vehicle 8170. When the vehicle 8170 is at the location 8170A (in the scene 8100), 3D ray tracing, as described with respect to FIG. 7, can be used to determine that a region 8180A is unobserved (e.g., invisible, obstructed) to the vehicle 8110. When the vehicle 8170 is at the location 8170B (in the scene 8200), 3D ray tracing can be used to determine that a region 8180B is unobserved (e.g., invisible, obstructed) to the vehicle 8110. When the vehicle 8170 is at the location 8170C (in the scene 8300), 3D ray tracing can be used to determine that a region 8180C is unobserved (e.g., invisible, obstructed) to the vehicle 8110. While the sensors of the vehicle 8110 cannot see the immediately beyond the vehicle 8170, the sensors are able to see beyond the obstructed regions.

Returning to FIG. 6, it is noted that the visibility grid is not limited to the second side. For example, as shown in FIG. 7A, the visibility grid includes visible regions on both sides of the occlusion 7030; and as shown in FIG. 8, the clear (i.e., non-lined) areas of the scenes 8100, 8200, 8300 are not limited to a second side.

At 6130, the technique 6000 alters a driving behavior of the first vehicle based on the visibility grid.

In an example, the first vehicle can be the world object that is on the first side of the occlusion and altering the driving behavior of the first vehicle based on the visibility grid can include determining that a second vehicle is in the second side of the occlusion and that the second vehicle obstructs a first trajectory of the first vehicle; and altering the driving behavior of the first vehicle so as to avoid a collision. For example, a second trajectory of the second vehicle can be predicted. That is, second locations at different future points in time of the second vehicle can be determined; first location of the first vehicle at the different future points in time can also be determined; and it can be determined that the second vehicle obstructs the first vehicle if the first vehicle and the second vehicle are predicted to be at roughly the same location at the same time.

In an example, altering the driving behavior of the first vehicle based on the visibility grid can include determining that the first vehicle is in a blind spot of a second vehicle; and altering the driving behavior of the first vehicle so that the first vehicle is no longer in the blind spot of the second vehicle. In an example, determining that the first vehicle is in the blind spot of the second vehicle can include determining at least a location or a pose of the second vehicle; and determining (e.g., building, computing, etc.) a visibility grid around the at least the location or the pose of the second vehicle.

The visibility grid can be based on (e.g., determined using, calculated using, etc.) a visibility model of a driver of the second vehicle. The visibility model can be based on a nominal field of view of a driver of the second vehicle when the driver is looking in the driving direction (e.g., typically, looking forward). The visibility model can be used to account for (e.g., take into consideration, determine, etc.) any objects that could be outside the field of view of the driver. Thus, the first side can correspond to (e.g., can be) a visible area according to a gaze model of a driver of the second vehicle (i.e., where the driver can naturally see) and the second side can correspond to a non-visible area (i.e., where the driver cannot naturally see) according to the gaze model.

In an example, altering the driving behavior of the first vehicle so that the first vehicle is no longer in the blind spot of the second vehicle can include controlling the first vehicle using at least one of a slow down action, a speed up action, or a lane change action.

Figure 9A:
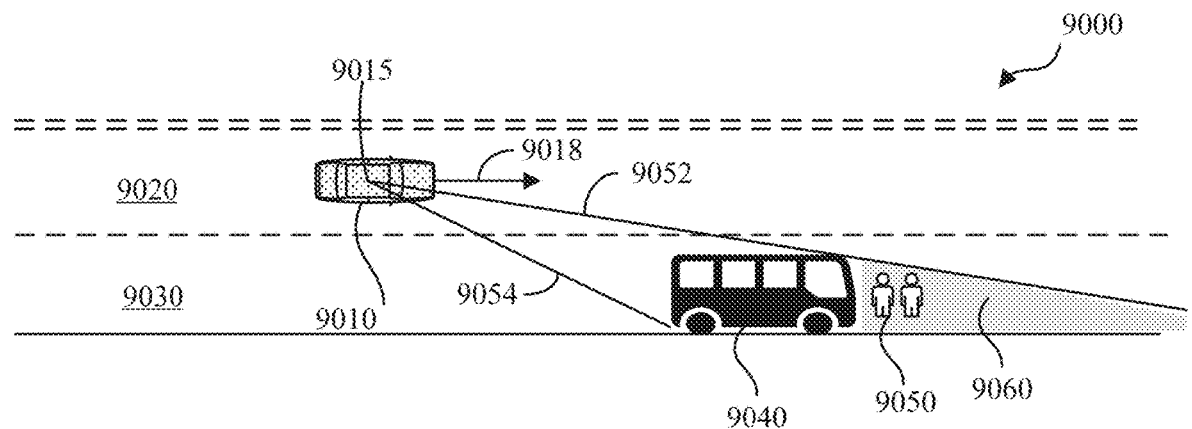
FIG. 9A is an example of a scenario for altering the driving behavior of an autonomous vehicle (AV) based on a visibility grid for the AV.
Figure 9B:
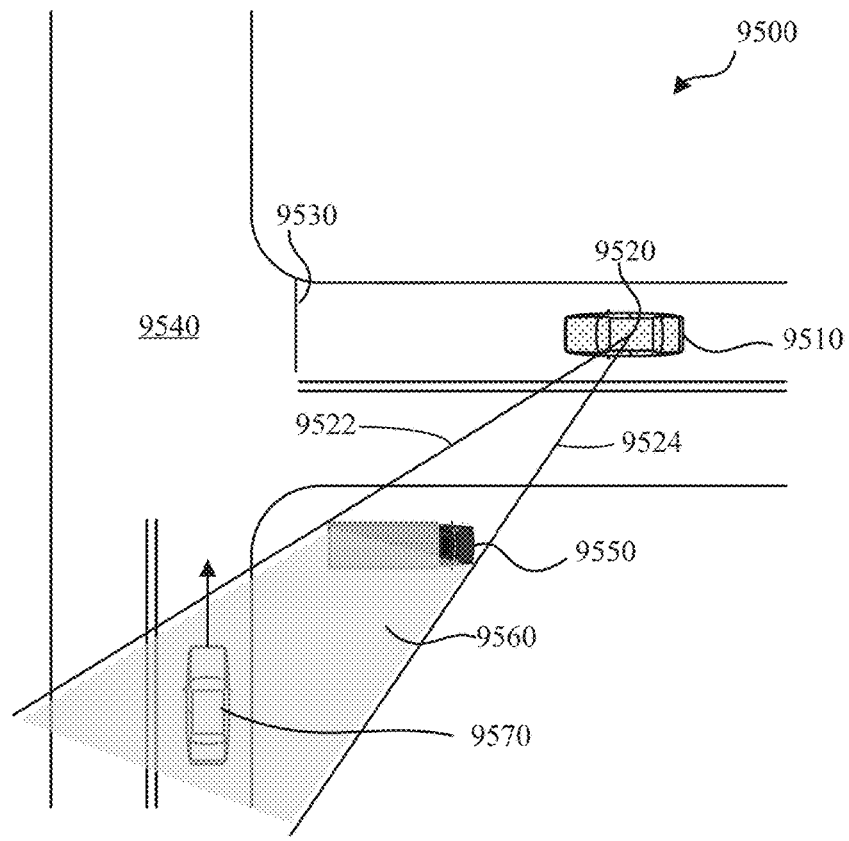
FIG. 9B is another example of a scenario for altering the driving behavior of an autonomous vehicle (AV) based on a visibility grid for the AV.

As alluded to above, an AV (i.e., modules therein) can reason about what the sensors of the AV itself cannot see to prevent getting in an accident (e.g., a collision or a near-miss). For example, using techniques such as LiDAR ray-tracing, image segmentation, and localization on a high-definition map, a visibility grid can be generated for the AV. The visibility grid can identify the parts of the nearby roads that the sensors of the AV can and cannot see. The visibility grid can be used to alter the driving behavior of the AV (e.g., by performing contingency planning and/or proactive safety assurance) such as by slowing down or adjusting a lane position of the AV to account for potential hazards that may appear from occluded (e.g., non-visible, unobserved) areas within the visibility grid. The AV can prevent accidents from happening, such as when, for example, a child runs out from behind a bus. Detection of occluded areas can also be used to increase scene understanding, such as when another road user goes into an occluded space, it can be predicted to emerge somewhere else. FIGS. 9A-9B illustrate such scenarios.

FIG. 9A is an example of a scenario 9000 for altering the driving behavior of an autonomous vehicle (AV) based on a visibility grid for the AV. The scenario 9000 illustrates a vehicle 9010 with a sensor 9015 (e.g., a LiDAR sensor) that is mounted on top of the vehicle 9010. The vehicle 9010 is traveling in a direction 9018 in a lane 9020. In an adjacent lane 9030, an occlusion 9040 is stopped. The occlusion 9040 can be detected as such (e.g., a bus, a vehicle, an occlusion, a large vehicle, a small vehicle, etc.) using, at least partially, sensor information from the sensor 9015. A second side 9060 of the occlusion 9040, for which a visibility grid is to be determined, is defined by beams 9052, 9054 of the sensor 9015. The visibility grid can be used to determine whether, for example, pedestrians 9050 exist in the second side 9060.

In an example, the occlusion 9040 may be of such height that it can be determined that the second side 9060 is, or is largely, observed (e.g., visible). As such, it can be conclusively determined whether the pedestrians 9050 exist in the second side 9060. If it is conclusively determined that the pedestrians 9050 do not exist, then the vehicle 9010 can proceed along its trajectory according to a predetermined (e.g., calculated) speed plan. On the other hand, if it is conclusively determined that the pedestrians 9050 do exist, then the driving behavior of the AV can be altered, such as by slowing down and/or moving slightly to the left.

On the other hand, the occlusion 9040 may be of such height that the second side is unobserved (e.g., not visible, obscured). In such a situation, the AV can determine a contingency plan so that if pedestrians were indeed in the second side 9060 and run onto the lane 9020, the vehicle 9010 could still avoid them.

A trajectory planner of the vehicle 9010 can calculate a contingency trajectory such that the vehicle 9010 need not necessarily move over right away to avoid the pedestrians 9050 running onto the lane 9020 in the future; rather, the contingency trajectory can be such that the vehicle 9010 moves over just enough so that, if the pedestrians run onto the lane 9020, an emergency maneuver could still be performed in time to guarantee that the vehicle 9010 can avoid a collision with the pedestrians 9050.

Contingency planning can rely on lateral (e.g., steering), longitudinal (e.g., speed) contingencies, or a combination thereof. Said another way, a contingency plan can include a lateral contingency, a longitudinal contingency, or both. A lateral contingency means a contingency that can require a right or a left steering. A longitudinal contingency means a contingency that can require a change in the speed of the vehicle 9010. In some situations, the change in the speed can be an increase in the speed. In some other situations, the change in the speed can be a decrease in the speed. In some situations, the longitudinal contingency can be an increase in the speed to, for example, a speed that exceeds the speed limit.

In an example, if the existence of pedestrians 9050 cannot be conclusively determined, the technique 6000, after determining the visibility grid, can compute a probability of a presence of an external object (e.g., the pedestrians 9050) within an unobserved region of the visibility grid. Computing the probability is further described below. Thus, in an example of the technique 6000, altering the driving behavior of the first vehicle based on the visibility grid can include computing the probability of a presence of an external object in the visibility grid; and traversing a portion of a vehicle transportation network using the probability.

Traversing the portion of the vehicle transportation network can include providing the probability to a scenario-specific operational control evaluation module instance of a scenario-specific operational control evaluation module from a plurality of scenario-specific operational control evaluation modules. For example, the probability could be provided to one or more of the SSOCEMs 4400 for a solution and output of candidate control actions as described with regard to the technique 5000.

FIG. 9B is another example of a scenario 9500 for altering the driving behavior of an autonomous vehicle (AV) based on a visibility grid for the AV. The scenario 9500 illustrates a vehicle 9510 with a sensor 9520 that is mounted on top of the vehicle 9510. The vehicle 9510 can be an autonomous vehicle. The vehicle 9510 is approaching a stop line 9530 of an intersection 9540, which is a T-intersection. An occlusion 9550, which can be identified using sensor information of the vehicle 9510.

A visibility grid 9560 can be determined as described above. The visibility grid is defined for a second side of the occlusion 9550 that is defined by beams 9522, 9524. Depending on the heights of different parts of the occlusion 9550, some regions of the visibility grid 9560 may be observed and/or some other regions may be unobserved. The visibility grid can be used to determine whether a vehicle 9570 exists in the second side of the occlusion (e.g., the side including the visibility grid 9560).

As described above with respect to FIG. 9A, the existence of the vehicle 9570 can be determined probabilistically or definitively. The existence (probabilistic or definitive) of the vehicle 9570 can be provided to one or more of the SSOCEMs 4400 (e.g., a T-intersection SSOCEM) for a solution and output candidate control actions as described with regard to the technique 5000. One of the actions can be used to alter the driving behavior of the vehicle 9510.

Figure 10A:
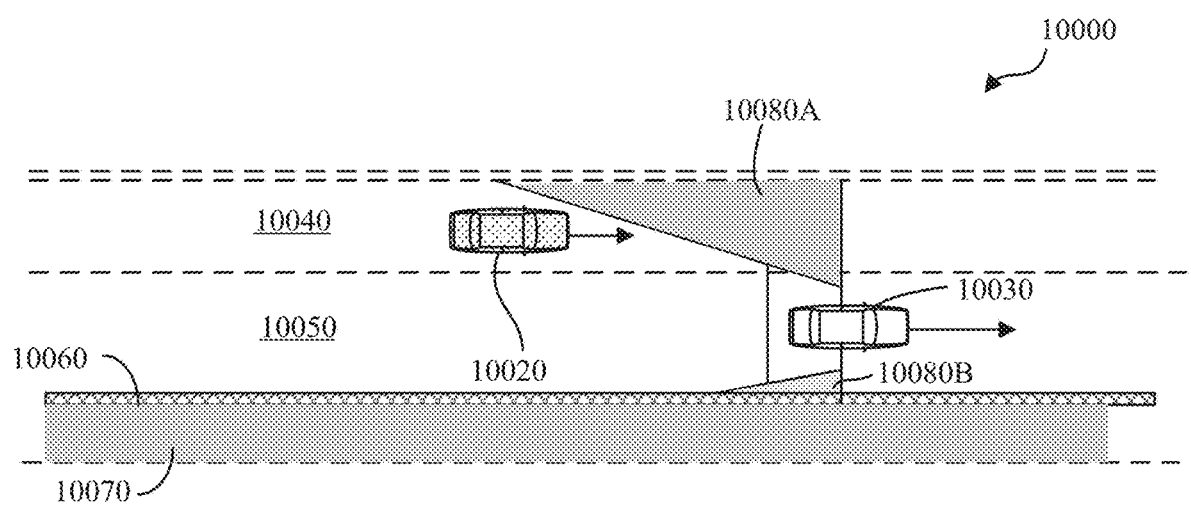
FIG. 10A is an example of a scenario for altering the driving behavior of an autonomous vehicle (AV) based on a visibility grid of an external object.
Figure 10B:
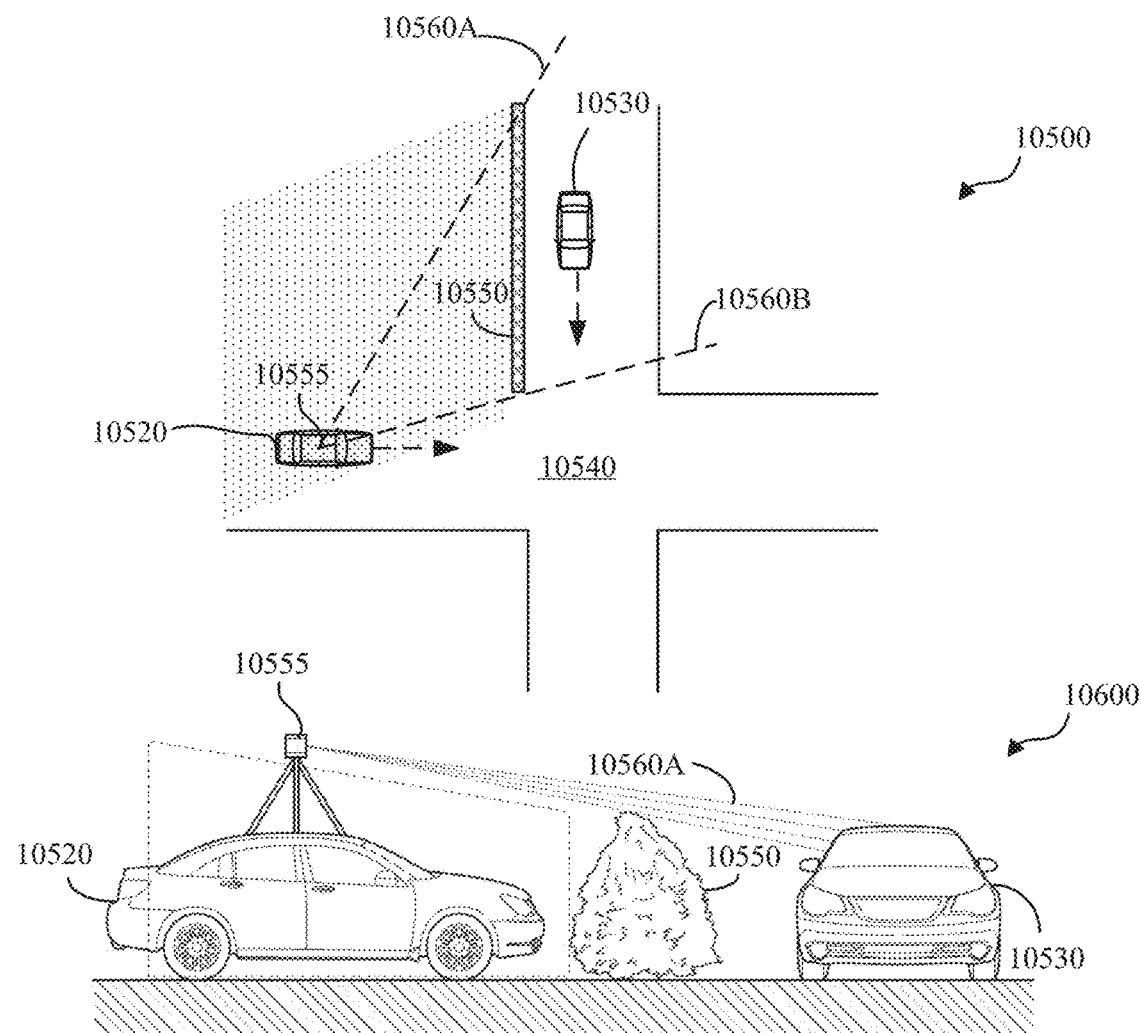
FIG. 10B is another example of a scenario for altering the driving behavior of an autonomous vehicle (AV) based on a visibility grid of an external object.

In other implementations, an AV (i.e., modules or techniques therein) can reason about what another external object cannot see to prevent getting into an accident with that external object. An estimate of the visible area for external object can be generated based on, for example, an a priori model. The model can include nominal driver gaze and/or A-pillar location (in the case of the external object is a vehicle), combined with 3D objects (i.e., occlusions). The 3D objects can be occlusions that are detected using the sensors of the AV, provided to the AV by vehicle-to-vehicle (V2V) and/or vehicle-to-infrastructure (V2I) communication, identified on a 3D map (e.g., a High Definition Map), or a combination thereof. Based on a prediction of where other road users (e.g., external objects) can see, the occluded areas (e.g., blind spots) of such other road users can be determined. The AV can alter its own behavior to avoid those occluded areas. FIGS. 10A-10B illustrate such scenarios.

FIG. 10A is an example of a scenario 10000 for altering the driving behavior of an autonomous vehicle (AV) based on a visibility grid of an external object. The scenario 10000 illustrates a vehicle 10020 (i.e., an AV) and a vehicle 10030 traveling in the same direction on lanes 10040 and 10050, respectively.

The vehicle 10020 (e.g., modules or techniques therein) can determine one or more visibility grids for the vehicle 10030. As described above, the visibility grids can be determined using a gaze model of a driver of the vehicle 10030.

For example, the vehicle 10020 can identify an occlusion 10060 for the vehicle 10030. The occlusion 10060 can be, for example, a short wall. The occlusion can be identified as described above. For example, the occlusion 10060 can be identified using sensor information of the vehicle 10020. For example, the occlusion 10060 can be identified using map information. Thus, a region 10070 that is on the other side of the occlusion 10060 as the vehicle 10030 can be determined to be unobserved.

Using the gaze model, the vehicle 10020 can determine that the regions 10080A and 10080B are in the blind spot of the driver of the vehicle 10030. As such, the regions 10080A and 10080B are unobserved by the driver. In response to determining that the vehicle 10020 is entering (or is in) an unobserved area (e.g., a blind spot) of the vehicle 10030, the driving behavior of the vehicle 10020 can be altered. For example, the vehicle 10020 can be slowed down, accelerated, or moved over to the left by one lane, if possible.

FIG. 10B is another example of a scenario 10500 for altering the driving behavior of an autonomous vehicle (AV) based on a visibility grid of an external object. A side view 10600 further describes the scenario 10500.

The scenario 10500 illustrates that a vehicle 10520 (e.g., an AV) and a vehicle 10530 (e.g., an external object) are each approaching an intersection 10540, as shown. The intersection 10540 can be an uncontrolled intersection of a residential area. An occlusion 10550 (e.g., a wall, a hedge, etc.) obstructs the view of the external object 10530.

The vehicle 10520 includes a sensor 10555, which is mounted on the roof of the vehicle 10520. The occlusion 10550 is short enough such that, in determining the visibility grid (using sensor beams, such as beams 10560A and 10560B) for the vehicle 10520 with respect to the occlusion 10550, the existence of the vehicle 10530 can be determined with certainty. That is, the vehicle 10530 is visible and known to the vehicle 10520. The vehicle 10520 can also determine a speed of the vehicle 10530 since the vehicle 10520 can track the vehicle 10530 over time. The vehicle 10530 can be determined to be speeding and that it would collide with the vehicle 10520 were the vehicle 10520 to continue along its current trajectory and according to its speed plan.

In another example, the existence of the vehicle 10530 can be received by the vehicle 10520. For example, the vehicle 10530 can broadcast information regarding itself. The vehicle 10530 can directly broadcast the information. The vehicle can transmit the information to a central location (e.g., server, the communication devices 2400 of FIG. 2, etc.), which in turn broadcasts the information. The broadcast information can include the location of the vehicle 10530 at different time points, its speed, descriptive information (e.g., make and model), more, fewer, other information, or a combination thereof. In another example, a road infrastructure component (e.g., a camera mounted on a public electric pole or building) or another vehicle can detect the presence of the vehicle 10530 and broadcast the information.

A visibility grid of the vehicle 10530 with respect to the occlusion 10550 can be determined by the vehicle 10520. Determining by the vehicle 10520 the visibility grid of the vehicle 10530 can mean that the vehicle 10520 itself (e.g., modules or techniques therein) can calculate (e.g., identify, form, produce, construct, generate, etc.) the visibility grid, can receive the visibility grid, or can determine the visibility grid in any way possible. In an example, the vehicle 10530 can receive (such as from an infrastructure component) the broadcast information including an indication that vehicle 10520 is invisible to the vehicle 10530. The visibility grid of the vehicle 10530 can be calculated using a visibility model, as described above.

In response to the vehicle 10520 determining that the vehicle 10520 is unobserved by the vehicle 10530 and that the speed and trajectory of the vehicle 10530 are such that a collision can result, the vehicle 10520 can alter its driving behavior (e.g., can slow down, etc.) to avoid the collision and or make itself visible to the driver of the vehicle 10530.

Returning to FIG. 6, in an example, the technique 6000 can include, in response to determining that an external object does not exist within the second side, not altering the driving behavior of the first vehicle.

In an example, the visibility grid includes an unobserved region and determining that the external object does not exist within the second side can be based on the size of the unobserved area. Reference is again made to FIG. 9A to illustrate. Assume that the occlusion 9040 is a bus with transparent windows such that a significant portion of the second side 9060 is visible. It may be determined that the unobserved region is so small that a pedestrian cannot fit in the unobserved region alone.

In an example, it can be determined that the external object does not exist based on the size of the unobserved region over time. For example, if at time steps $t_{-n}$ to $t_{-1}$ the size of the unobserved area is such that no external object can exist in the unobserved area, then, at $t_0$, it can also be determined that the external object does not exist.

In yet other implementations of 3D occlusions reasoning for accident avoidance, it can be determined where at least one of two or more other road users cannot see to prevent an accident from happening between them. Using the same visibility model described above, it can be determined what multiple other road users can and cannot see. Actions can be taken (e.g., an audible and/or visual warning) to alert those other vehicles or pedestrians of potential collisions that may happen with another object that is occluded from their view. For example, if an AV sees a vehicle approaching at high speed from behind a large wall and another biker heading towards the wall and cannot see that vehicle, alert signals can be provided to the vehicle and/or the biker to, for example, slow down for the other road user to prevent an accident.

FIG. 11 is a flow chart diagram of another technique 11000 for traversing a vehicle transportation network using 3D occlusions reasoning for accident avoidance in accordance with embodiments of this disclosure. The technique 11000 may be implemented by a module of a vehicle, such as the vehicle 1000 of FIG. 1. The technique 11000 can stored in a memory as executable instructions that can executed by a processor.

The technique 11000 is described using the scenario of FIG. 12. FIG. 12 is an example of a scenario 12000 for alerting external objects based on a visibility grid of at least one of the external objects. The scenario 12000 illustrates a vehicle 12020, a vehicle 12030 (e.g., a first world object, a second world object) that is traveling along a trajectory 12040, and a motorcycle 12050 (e.g., a second world object, a first world object) that is traveling along a trajectory 12060. In another example, the vehicle 12020 can be an infrastructure component that can perform the operations described with respect to the vehicle 12020. The technique 11000 can be performed by the vehicle 12020 or the infrastructure component. The technique 11000 can be stored in a memory, such as the memory 1340 of FIG. 1, as executable instructions, which can be executed by a processor, such as the processor 1330 of FIG. 1.

Returning to FIG. 11, at 11010, the technique 11000 identifies a first trajectory of a first world object in the vehicle transportation network. The first object can be one of the vehicle 12030 or the motorcycle 12050.

In an example, the vehicle 12030 and the motorcycle 12050 can be maintained in a world modeling module of the vehicle 12020. As described above, the world modeling module can also maintain other information with respect to each world object, such as predicted trajectories (e.g., future locations), speeds, poses, etc. Based on such information, it can be predicted that the vehicle 12030 and the motorcycle 12050 are likely to collide at a location 12065.

At 11020, the technique 11000 identifies a visibility grid of the first world object. In an example, an occlusion may be identified and a visibility grid can be identified with respect to the occlusion. For example, the vehicle 12020 can identify an occlusion 12070. The occlusion 12070 can be identified using map information. The occlusion 1270 may be a building, a wall, or some other occlusion. The occlusion 12070 can be identified using sensors of the vehicle 12020. In a case that the first world object is the vehicle 12030, the technique 11000 identifies a visibility grid 12090 with respect to the occlusion 12070. In a case that the first world object is the motorcycle 12050, the technique 11000 identifies a visibility grid 12090. As described above, each of the visibility grids 12080, 12090 can be identified based on a visibility model of the rider of the motorcycle 12050 and a visibility model of the driver of the vehicle 12030, respectively.

At 11030, the technique 11000 identifies, using the visibility grid, a second object that is invisible to the first world object. The technique 11000 can identify that the motorcycle 12050 is invisible (e.g., unobserved) to the vehicle 12030. The technique 11000 can identify that the vehicle 12030 is invisible (e.g., unobserved) to the motorcycle 12050.

At 11040, the technique 11000 determines whether the first world object and the second world object are predicted to collide. Determining whether the first and the second world objects will collide can be based on predicting the locations of the first and the second world objects at future points in time and whether the first and the second world objects are predicted at the same location at the same time. That is, determining whether the first and the second world objects will collide can be based on predicting the trajectories of the first and the second world objects.

If a collision is predicted, then, at 11050, the technique 11000 alerts at least one of the first world object or the second object. In an example, at least one of an audible or visual notification can be emitted, such as from the vehicle 12020. The vehicle 12020 may sound its horn, may use text-to-speech to output, using external speakers, a warning message, may display warning messages on an external display that is attached to the vehicle 12020, may emit the warning notification in some other way, or a combination thereof.

As mentioned above, a probability of an object existing in an unobserved region can be computed. Computing the probability can include comparing the visibility grid to a map. Comparing the visibility grid to a map can include overlaying the visibility grid with the map using a common coordinate system. The map may be a high-definition (HD) map. The common coordinate system can be the coordinate system of the map, where the sensor data is transformed from its native coordinate system to the coordinate system of the map. The map may be a portion of the vehicle transportation network, similar to the example of the vehicle transportation network 3000 in FIG. 3. Based on important location(s) on the map (e.g., crosswalks, behind vehicles blocking sight, intersection lanes occluded by something, etc.), the probability that something can be in an unobserved region may be computed by integrating an area of an important location with the visibility grid. For example, comparing the visibility grid to the map can include determining a feature within the map, where the feature defines a polygonal region. Then, computing the probability comprises integrating an area of the polygonal region with the visibility grid. Integrating the area may include computing the probability as a proportion of observed points (i.e., coordinates) in the polygonal region to all points in the polygonal region.

The polygonal region is defined by the feature, and the feature may depend upon the identification of an important location. This may be explained by reference to how the probability may be computed for different SSOCEMs. For example, and with regard to a pedestrian SSOCEM, when a vehicle is approaching a crosswalk as indicated by the map, the feature is at least a portion of the crosswalk. The polygonal region may extend across the road (i.e., between entry points for the crosswalk) for the width of the crosswalk. That is, the polygonal region may be bounded by the edges of the road and the lines marking the crosswalk. Then, the proportion of the observed points among all points (both in observed and unobserved regions) within the polygonal region is a probability that an external object exists in the unobserved region. For example, the probability can be a probability of a presence of a pedestrian within or adjacent to the crosswalk. The pedestrian may be adjacent to an entrance of the crosswalk. In some implementations, a similar analysis may be done when an external object results in an unobserved region where a pedestrian may be jaywalking or starting to jaywalk. In this case, a default polygonal region may be defined that is the same width, or is narrower than, a standard crosswalk.

With regard to a lane change SSOCEM, when a vehicle is planning to change lanes, such as into the right traveling lane or into an oncoming lane, the feature is the lane into which the vehicle is attempting a lane change. This may also be referred to a lane adjacent to the lane in which the vehicle is traveling. The presence of other vehicles can result in an unobserved region in the adjacent lane. The probability that an external object exists an unobserved region may be equal to the proportion of the observed points among all points (both in observed and unobserved regions) within a polygonal region.

Techniques for computing the probability described herein may vary. For example, the coordinates closer to the autonomous vehicle could be weighted differently from those more distant from the autonomous vehicle.

The probability may be considered representative of a virtual vehicle in a lane or a virtual pedestrian, e.g., in a crosswalk. These virtual external objects may be modeled in various ways. It is desirable if a virtual external object is modeled as a worst-case scenario in some implementations. For example, one condition that may belong to a worst-case scenario is that an object is located just outside of the observed coordinates in the visibility grid. That is, the object may be just inside of the unobserved region. Another condition of a worst-case scenario may be that the object is traveling towards the route or path of the autonomous vehicle and/or blocks the autonomous vehicle. A virtual pedestrian may be modeled as walking at a brisk pace, while a virtual vehicle may be modeled as traveling at the speed limit for the lane or road in which it is located (if it exists).

The modeled virtual vehicle or pedestrian is treated as an actual vehicle or pedestrian (with a probability of existence) that can be used in the decision-making process. For example, when the vehicle 9510 is relatively far from the intersection 9540, as shown in FIG. 9B, a virtual vehicle (i.e., the vehicle 9570) shown in FIG. 9B is close to and heading into the intersection 9540. That is, the vehicle 9570 is represented at a location in the unobserved region adjacent to the observed region according to the visibility grid 9560. As the vehicle 9510 moves closer to the intersection 9540, the virtual vehicle (e.g., the vehicle 9570) can be farther away. This change in location is due to the change in the observed and unobserved regions over time. Virtual vehicles can be represented at locations in the unobserved region adjacent to the observed region according to the visibility grid.

Although described herein with reference to an autonomous vehicle, the methods and apparatus described herein may be implemented in any vehicle capable of autonomous or semi-autonomous operation. Although a vehicle transportation network is described mainly with reference to road, the vehicle transportation network can include the vehicle operating in any area navigable by the vehicle.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in traversing a vehicle transportation network by a first vehicle, the method comprising:
   identifying an occlusion in the vehicle transportation network;
   identifying, for the first vehicle that is on a first side of the occlusion, a visibility grid on a second side of the occlusion that is different from the first side, the visibility grid is identified with respect to a region of interest that is at least a predefined distance above ground,
   wherein the visibility grid is used to identify first portions of roads sensed by a sensor positioned on the first vehicle and second portions of the roads that are not sensed by the sensor; and
   altering a driving behavior of the first vehicle based on the visibility grid.

2. The method of claim 1, wherein the predefined distance above ground is selected based on a height of objects of interest likely to be on the second side.

3. The method of claim 1, wherein the region of interest has a height that is greater than the predefined distance above ground such that a subset of sensor beams of the sensor enter the region of interest and at least some of the subset of the sensor beams are blocked by the occlusion.

4. The method of claim 1, wherein altering the driving behavior of the first vehicle based on the visibility grid comprises:
   altering the driving behavior of the first vehicle so as to avoid a collision responsive to
   determining that a second vehicle exists on the second side and that the second vehicle obstructs a first trajectory of the first vehicle,
   wherein determining that the second vehicle obstructs the first trajectory of the
   first vehicle comprises predicting a second trajectory of the second vehicle based on locations at different future points in time of the second vehicle.

5. The method of claim 1, wherein altering the driving behavior of the first vehicle based on the visibility grid comprises:
   controlling the first vehicle using at least one of a slow down action, a speed up action, or a lane change action responsive to determining that a second vehicle exists in the second side and that the second vehicle obstructs a first trajectory of the first vehicle and that the first vehicle is in a blind spot of the second vehicle,
   wherein the first side corresponds to a visible area according to a gaze model of a driver of the second vehicle and the second side corresponding to a non-visible area according to the gaze model.

6. The method of claim 5, wherein determining that the first vehicle is in the blind spot of the second vehicle comprises:
   determining at least a location or a pose of the second vehicle; and
   determining a visibility model around the at least the location or the pose of the second vehicle based on a nominal field of view of the driver of the second vehicle.

7. The method of claim 1, wherein the occlusion is identified using a point cloud map obtained using the sensor of the first vehicle.

8. The method of claim 1, wherein identifying, for the first vehicle that is on the first side of the occlusion, the visibility grid on the second side of the occlusion comprises:
performing 3-dimensional ray-tracing through a 3-dimensional volume of the second side; and
marking a region of the second side as either observed or unobserved based on the 3-dimensional ray-tracing.

9. The method of claim 1, wherein altering the driving behavior of the first vehicle based on the visibility grid comprises:
altering the driving behavior of the first vehicle based on a probability of a pedestrian being present within an unobserved region of the visibility grid.

10. The method of claim 9, wherein altering the driving behavior of the first vehicle based on the visibility grid further comprises:
determining a contingency trajectory such that the first vehicle moves over just enough so that if the pedestrian moves onto a respective lane that the first vehicle traverses on, an emergency maneuver is performed in time to avoid a collision with the pedestrian.

11. A method for use in traversing a vehicle transportation network by a first vehicle, the method comprising:
identifying an occlusion in the vehicle transportation network;
identifying, for the first vehicle that is on a first side of the occlusion, a visibility grid on a second side of the occlusion that is different from the first side, wherein a height of the occlusion is such that at least some world objects in the visibility grid are undetectable by a sensor of the first vehicle;
computing a probability of a presence of a world object within an unobserved region of the visibility grid; and
altering a driving behavior of the first vehicle based on the probability.

12. The method of claim 11, wherein altering the driving behavior of the first vehicle based on the probability comprises:
using a scenario-specific operational control evaluation module that identifies a vehicle control action from one or more candidate vehicle control actions.

13. The method of claim 11, wherein computing the probability of the presence of the world object within the unobserved region of the visibility grid comprises:
comparing the visibility grid to a map by overlaying the visibility grid with the map that uses a common coordinate system.

14. The method of claim 11, wherein computing the probability of the presence of the world object within the unobserved region of the visibility grid comprises:
comparing the visibility grid to a map based on a feature that defines a polygonal region within the map, wherein the feature is determined based on a location of a specific environmental scenario;
integrating an area of the polygonal region with the visibility grid; and
computing the probability as a proportion of observed points in the polygonal region to all points in the polygonal region.

15. An apparatus for use in traversing a vehicle transportation network by a vehicle, the apparatus comprising:
a non-transitory computer readable medium; and
a processor configured to execute instructions stored on the non-transitory computer readable medium to:
identify an occlusion in the vehicle transportation network, wherein the vehicle is on a first side of the occlusion;
determine a visibility grid that is a predefined distance above ground on a second side of the occlusion based on a height of external objects of interest that are likely to be on the second side of the occlusion,
wherein the second side is different from the first side; and
in response to determining, based on the visibility grid, that the external object exists within the second side, alter a driving behavior of the vehicle.

16. The apparatus of claim 15, wherein the instructions further comprise instructions to:
in response to determining that no external objects exist within the second side, not alter the driving behavior of the vehicle.

17. The apparatus of claim 16,
wherein the visibility grid comprises an unobserved region, and
wherein to determine that no external objects exist within the second side comprises to:
determine that no external objects exist based on a size of the unobserved region.

18. The apparatus of claim 16, wherein to determine that no external objects exist within the second side comprises to:
compute a probability of a presence of an external object within an unobserved region of the visibility grid.

19. The apparatus of claim 18, wherein to compute the probability of the presence of the external object within the unobserved region of the visibility grid comprises to:
compare the visibility grid to a map based on a feature that defines a polygonal region within the map, wherein the feature is determined based on a location of a specific environmental scenario;
integrate an area of the polygonal region with the visibility grid; and
compute the probability as a proportion of observed points in the polygonal region to all points in the polygonal region.

20. The apparatus of claim 15, wherein to determine the visibility grid comprises to:
perform, after removing ground points from sensor information, 3-dimensional ray-tracing through a 3-dimensional volume of the second side; and
mark an area of the second side as non-visible based on the 3-dimensional ray-tracing.

* * * * *